(12) United States Patent
Nayebi et al.

(10) Patent No.: US 11,695,614 B2
(45) Date of Patent: Jul. 4, 2023

(54) SYSTEMS, METHODS AND DEVICES FOR JOINT CALIBRATION OF TRANSMIT AND RECEIVE IQ MISMATCH

(71) Applicant: Samsung Electronics Co., Ltd., Suwon-si (KR)

(72) Inventors: Elina Nayebi, San Diego, CA (US); Pranav Dayal, San Diego, CA (US); Kee-Bong Song, San Diego, CA (US); Siu-Chuang Ivan Lu, San Jose, CA (US); Sang Won Son, Palo Alto, CA (US)

(73) Assignee: SAMSUNG ELECTRONICS CO., LTD.

( * ) Notice: Subject to any disclaimer, the term of this patent is extended or adjusted under 35 U.S.C. 154(b) by 248 days.

(21) Appl. No.: 17/064,598

(22) Filed: Oct. 6, 2020

(65) Prior Publication Data

US 2021/0377095 A1 Dec. 2, 2021

Related U.S. Application Data

(60) Provisional application No. 63/025,974, filed on May 15, 2020.

(51) Int. Cl.
*H04L 27/36* (2006.01)
*H04L 27/38* (2006.01)
(Continued)

(52) U.S. Cl.
CPC .......... *H04L 27/364* (2013.01); *H04L 27/148* (2013.01); *H04L 27/2003* (2013.01); *H04L 27/2695* (2013.01); *H04L 27/3863* (2013.01)

(58) Field of Classification Search
CPC . H04L 27/364; H04L 27/148; H04L 27/2003; H04L 27/2695; H04L 27/3863; H04L 25/0212
See application file for complete search history.

(56) References Cited

U.S. PATENT DOCUMENTS 8,233,524 B2  7/2012  Thirumoorthy
8,385,457 B2  2/2013  Laudel et al.
(Continued)

FOREIGN PATENT DOCUMENTS

EP  1626516 A2 *  2/2016  ............. H03D 3/009
EP  2892193 B1 *  3/2017  ............. H03D 3/009

OTHER PUBLICATIONS

Aoki, Yuuichi et al., "1.4-GHz Bandwidth Frequency-Dependent I/Q Imbalance Calibration for 5G mmWave Communications", 2019 IEEE/MTT-S International Microwave Symposium.
(Continued)

*Primary Examiner* — Jean B Corrielus
(74) *Attorney, Agent, or Firm* — Renaissance IP Law Group LLP

(57) ABSTRACT

A method of compensating for IQ mismatch (IQMM) in a transceiver may include sending first and second signals from a transmit path through a loopback path, using a phase shifter to introduce a phase shift in at least one of the first and second signals, to obtain first and second signals received by a receive path, using the first and second signals received by the receive path to obtain joint estimates of transmit and receive IQMM, at least in part, by estimating the phase shift, and compensating for IQMM using the estimates of IQMM. Using the first and second signals received by the receive path to obtain estimates of the IQMM may include processing the first and second signals received by the receive path as a function of one or more frequency-dependent IQMM parameters.

19 Claims, 9 Drawing Sheets

(51) Int. Cl.
*H04L 27/148* (2006.01)
*H04L 27/26* (2006.01)
*H04L 27/20* (2006.01)

(56) References Cited

U.S. PATENT DOCUMENTS

| | | |
|---|---|---|
| 9,148,234 B2 | 9/2015 | Sundström et al. |
| 9,350,487 B2 | 5/2016 | Schubert et al. |
| 9,444,560 B1 | 9/2016 | Goh |
| 9,628,256 B2 | 4/2017 | O'Keeffe et al. |
| 10,412,698 B2 | 9/2019 | Gou et al. |
| 11,012,201 B2 * | 5/2021 | Hormis ................. H04L 1/243 |
| 2011/0292978 A1 * | 12/2011 | Kravitz ................. H04B 1/30 |
| | | 375/221 |
| 2012/0170622 A1 * | 7/2012 | Ly-Gagnon ......... H04L 27/3854 |
| | | 375/219 |
| 2013/0157601 A1 | 6/2013 | O'Keeffee et al. |
| 2014/0140379 A1 * | 5/2014 | Teplitsky ............... H04B 17/21 |
| | | 375/219 |
| 2015/0036727 A1 * | 2/2015 | Kravitz ............... H04B 1/0475 |
| | | 375/221 |
| 2016/0173317 A1 * | 6/2016 | Bitton ................. H04L 27/3863 |
| | | 455/114.2 |
| 2020/0099408 A1 | 3/2020 | Nayebi et al. |

OTHER PUBLICATIONS

Petit, Michael et al., "Analysis of a Propemess-Based Blind Adaptive I/Q Filter Mismatch Compensation", IEEE Transactions on Wireless Communications, vol. 15, No. 1, Jan. 2016.

* cited by examiner

| Phase | Transmitted Signal | Captured Signal | Equations |
|---|---|---|---|
| $\theta_0$ | $-f_k \leftarrow \quad \rightarrow f_k$ | $-f_k \leftarrow \quad \rightarrow f_k$ | $R_{1,k} = A_{RX}A_{TX}G_{1RX}(f_k)G_{1TX}(f_k) + A_{RX}^*A_{TX}G_{2RX}(f_k)G_{2TX}^*(-f_k)$ <br> $R_{2,k} = A_{RX}A_{TX}^*G_{1RX}(-f_k)G_{2TX}(-f_k) + A_{RX}A_{TX}^*G_{2RX}(-f_k)G_{1TX}^*(f_k)$ |
| $\theta_0$ | $-f_k \leftarrow \quad \rightarrow f_k$ | $-f_k \leftarrow \quad \rightarrow f_k$ | $R_{3,k} = A_{RX}A_{TX}^*G_{1RX}(-f_k)G_{1TX}(-f_k) + A_{RX}^*A_{TX}^*G_{2RX}(-f_k)G_{2TX}^*(f_k)$ <br> $R_{4,k} = A_{RX}A_{TX}G_{1RX}(f_k)G_{2TX}(f_k) + A_{RX}^*A_{TX}G_{2RX}(f_k)G_{1TX}^*(-f_k)$ |
| $\theta_1$ | $-f_k \leftarrow \quad \rightarrow f_k$ | $-f_k \leftarrow \quad \rightarrow f_k$ | $R_{5,k} = \beta_{1,k}A_{RX}A_{TX}G_{1RX}(f_k)G_{1TX}(f_k) + \beta_{2,k}^*A_{RX}^*A_{TX}G_{2RX}(f_k)G_{2TX}^*(-f_k)$ <br> $R_{6,k} = \beta_{2,k}A_{RX}A_{TX}^*G_{1RX}(-f_k)G_{2TX}(-f_k) + \beta_{1,k}^*A_{RX}A_{TX}^*G_{2RX}(-f_k)G_{1TX}^*(f_k)$ |
| $\theta_1$ | $-f_k \leftarrow \quad \rightarrow f_k$ | $-f_k \leftarrow \quad \rightarrow f_k$ | $R_{7,k} = \beta_{2,k}A_{RX}A_{TX}^*G_{1RX}(-f_k)G_{1TX}(-f_k) + \beta_{1,k}^*A_{RX}^*A_{TX}^*G_{2RX}(-f_k)G_{2TX}^*(f_k)$ <br> $R_{8,k} = \beta_{1,k}A_{RX}A_{TX}G_{1RX}(f_k)G_{2TX}(f_k) + \beta_{2,k}^*A_{RX}^*A_{TX}G_{2RX}(f_k)G_{1TX}^*(-f_k)$ |
| $\theta_2$ | $-f_k \leftarrow \quad \rightarrow f_k$ | $-f_k \leftarrow \quad \rightarrow f_k$ | $R_{9,k} = \beta_{3,k}A_{RX}A_{TX}G_{1RX}(f_k)G_{1TX}(f_k) + \beta_{4,k}^*A_{RX}^*A_{TX}G_{2RX}(f_k)G_{2TX}^*(-f_k)$ <br> $R_{10,k} = \beta_{4,k}A_{RX}A_{TX}^*G_{1RX}(-f_k)G_{2TX}(-f_k) + \beta_{3,k}^*A_{RX}A_{TX}^*G_{2RX}(-f_k)G_{1TX}^*(f_k)$ |
| $\theta_2$ | $-f_k \leftarrow \quad \rightarrow f_k$ | $-f_k \leftarrow \quad \rightarrow f_k$ | $R_{11,k} = \beta_{4,k}A_{RX}A_{TX}^*G_{1RX}(-f_k)G_{1TX}(-f_k) + \beta_{3,k}^*A_{RX}^*A_{TX}^*G_{2RX}(-f_k)G_{2TX}^*(f_k)$ <br> $R_{12,k} = \beta_{3,k}A_{RX}A_{TX}G_{1RX}(f_k)G_{2TX}(f_k) + \beta_{4,k}^*A_{RX}^*A_{TX}G_{2RX}(f_k)G_{1TX}^*(-f_k)$ |

FIG. 5 ts/table)

SYSTEMS, METHODS AND DEVICES FOR JOINT CALIBRATION OF TRANSMIT AND RECEIVE IQ MISMATCH

CROSS-REFERENCE TO RELATED APPLICATIONS

This application claims priority to, and the benefit of, U.S. Provisional Patent Application Ser. No. 63/025,974 titled "Joint Calibration of Tx and Rx Frequency-Dependent IQ Mismatch" filed May 15, 2020 which is incorporated by reference.

TECHNICAL FIELD

This disclosure relates generally to quadrature transceivers, and more specifically to joint calibration of transmit and receive mismatch in quadrature transceivers.

BACKGROUND

Quadrature transceivers may have transmit (TX) and receive (RX) paths, each of which may have in-phase (I) and quadrature (Q) paths. An imbalance or mismatch between the I and Q paths is known as IQ mismatch (IQMM).

The above information disclosed in this Background section is only for enhancement of understanding of the background of the invention and therefore it may contain information that does not constitute prior art.

SUMMARY

A method of compensating for IQ mismatch (IQMM) in a transceiver may include sending first and second signals from a transmit path through a loopback path, using a phase shifter to introduce a phase shift in at least one of the first and second signals, to obtain first and second signals received by a receive path, using the first and second signals received by the receive path to obtain joint estimates of transmit and receive IQMM, at least in part, by estimating the phase shift, and compensating for IQMM using the estimates of IQMM. The method may further include sending a third signal from the transmit path through the loopback path, using the phase shifter to introduce a phase shift in at least two of the first, second, and third signals, to obtain a third signal received by the receive path, and using the first, second, and third signals received by the receive path to obtain joint estimates of the transmit and receive IQMM, at least in part, by estimating the phase shift. Using the first and second signals received by the receive path to obtain estimates of the IQMM may include processing the first and second signals received by the receive path as a function of one or more frequency-dependent IQMM parameters. Using the first and second signals received by the receive path to obtain estimates of the IQMM may be performed using a system of nonlinear equations. Compensating for IQMM using the estimates of IQMM may include estimating coefficients of an IQMM pre-compensator at the transmit path. Compensating for IQMM using the estimates of IQMM may include estimating coefficients of an IQMM compensator at the receive path. The first signal received by the receive path may include a component at a principle frequency of the first signal and a component at a mirror frequency of the first signal. The estimates of IQMM may be obtained by solving a system of equations, and one or more of the equations may include at least one of the first or second signals received by the receive path, a first parameter representing, at least in part, the phase shift, a second parameter representing, at least in part, a desired frequency response of the transmit path, a third parameter representing, at least in part, a frequency response of the transmit path due to transmit IQMM, a fourth parameter representing, at least in part, a desired frequency response of the receive path, and a fifth parameter representing, at least in part, a frequency response of the receive path due to receive IQMM. The one or more of the equations may further include a sixth parameter representing, at least in part, a gain and delay for the transmit path, and a seventh parameter representing, at least in part, a gain and delay for the receive path. The desired frequency response of the transmit path may depend, at least in part, on a frequency response of an in-phase filter in the transmit path, a frequency response of a quadrature filter in the transmit path, a phase mismatch between an in-phase mixer and a quadrature mixer in the transmit path, and a gain mismatch between the in-phase mixer and the quadrature mixer in the transmit path; and the frequency response of the transmit path due to transmit IQMM may depend, at least in part, on the frequency response of the in-phase filter in the transmit path, the frequency response of the quadrature filter in the transmit path, the phase mismatch between the in-phase mixer and the quadrature mixer in the transmit path, and the gain mismatch between the in-phase mixer and the quadrature mixer in the transmit path. The desired frequency response of the receive path may depend, at least in part, on a frequency response of an in-phase filter in the receive path, a frequency response of a quadrature filter in the receive path, a phase mismatch between an in-phase mixer and a quadrature mixer in the receive path, and a gain mismatch between the in-phase mixer and the quadrature mixer in the receive path; and the frequency response of the receive path due to receive IQMM may depend, at least in part, on the frequency response of the in-phase filter in the receive path, the frequency response of the quadrature filter in the receive path, the phase mismatch between the in-phase mixer and the quadrature mixer in the receive path, and the gain mismatch between the in-phase mixer and the quadrature mixer in the receive path. The estimates of IQMM may be obtained using a first iterative algorithm based on an initial estimate, and the initial estimate may be obtained using a second algorithm. The first iterative algorithm may include a block coordinate descent, and the second algorithm comprises a matrix inversion.

A system may include a quadrature transceiver having a transmit path with a quadrature up-converter, a receive path with a quadrature down-converter, and a loopback path coupled between the up-converter and the down-converter; a signal generator arranged to apply first and second pilot signals to the IQ transmit path; a signal observer arranged to capture the first and second pilot signals received from the receive path; a phase shifter arranged to apply a phase shift to at least one of the first and second pilot signals between the up-converter and the down-converter, and a processor configured to: obtain estimated IQ mismatch (IQMM) parameters for the transmit path and the receive path by estimating the phase shift; and estimate one or more compensation coefficients for the quadrature transceiver based on the estimated IQMM parameters. The system may further include an IQMM pre-compensator arranged to compensate an IQMM of the transmit path based on one or more of the compensation coefficients. The system may further include an IQMM compensator arranged to compensate an IQMM of the receive path based on one or more of the compensation coefficients.

A method may include estimating an initial value of a phase mismatch for a receive (RX) path of a quadrature transceiver, estimating an initial value of a cross multiplication factor for a real-value compensator (RVC) for the RX path based on the initial value of the RX phase mismatch, obtaining a re-estimate of the RX phase mismatch, and correcting the initial value of the cross multiplication factor based on the re-estimate of the RX phase mismatch. Obtaining the re-estimate of the RX phase mismatch may include obtaining one or more RVC parameters for the RVC, obtaining an estimated transmit (TX) phase mismatch for a TX path of the quadrature transceiver, applying the RVC with the one or more RVC parameters to a time-domain signal received without phase shift at baseband of the RX path, thereby generating a compensated time-domain signal, and re-estimating a residual RX phase mismatch based on the compensated time-domain signal and the estimated TX phase mismatch. The re-estimate of the RX phase mismatch may be a first re-estimate for a first pilot signal at a first frequency, and the method may further include obtaining a second re-estimate of the RX phase mismatch for a second pilot signal at a second frequency, and correcting the initial value of the cross multiplication factor based on the first and second re-estimate of the RX phase mismatch. The method may further include obtaining a third re-estimate of the RX phase mismatch for a third pilot signal at a third frequency, and correcting the initial value of the cross multiplication factor based on the first, second, and third re-estimate of the RX phase mismatch.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

FIG. 5 illustrates example embodiments of spectral plots of transmitted and captured (observed) signals according to this disclosure.

DETAILED DESCRIPTION

Overview

Figure 1:
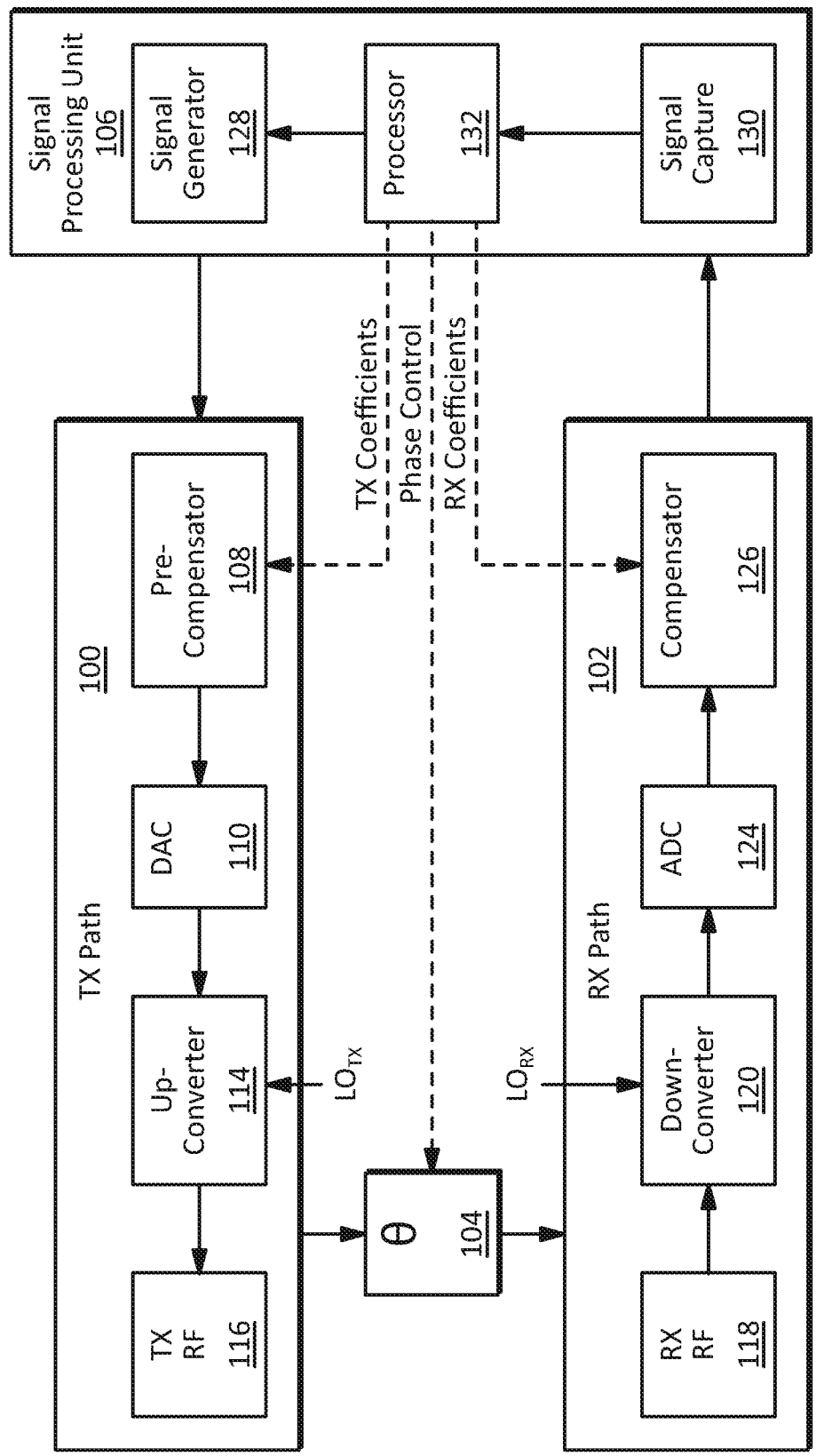
FIG. 1 illustrates an embodiment of a quadrature transceiver that may be used to implement joint TX and RX IQMM calibration according to this disclosure.

This disclosure encompasses numerous inventive principles relating to in-phase (I) and quadrature (Q) mismatch (IQMM) in quadrature transceivers. Some of the principles involve techniques for jointly estimating IQMM, which may include frequency-dependent IQMM (FD-IQMM), in both the transmit (TX) and receive (RX) paths of a quadrature transceiver. In some embodiments, two or more pilot signals may be applied at baseband to the TX path which may be coupled to the RX path through a loopback path. Different phase shifts may be applied to the pilot signals, for example, through the use of a phase shifter in the loopback path. The received pilot signals may be observed at baseband of the RX path and analyzed using various disclosed algorithms to estimate the IQMM in both the TX and RX paths.

The observed signals may be formulated as one or more functions of IQMM parameters and/or ratios or other combinations thereof. In some embodiments, systems of equations may be formulated using IQMM parameters to provide enough equations to estimate or solve for the number of unknown variables provided by the parameters. Different equations may be formulated, for example, based on different phase shift values and/or frequencies of the pilot signals. The equations may be estimated and/or solved using techniques such as block coordinate descent (BCD), gradient descent, Newton's method, and/or the like. In some embodiments.

IQMM parameters may be estimated and/or solved using division and matrix inversion, for example, in implementations that may ignore one or more image of image signals. In some embodiments, one or more estimates obtained using one technique may be used as initial estimates for another estimation technique.

In various embodiments, one or more of the IQMM parameters may be related to physical aspects of a transceiver such as the frequency response of a filter, a scaling factor that may account for a gain and/or delay associated with transmission and/or receiver links, the gain and/or phase mismatch of mixers, and/or the like. In some embodiments, one or more unknown variables may account for a phase shift applied to a pilot signal. This may enable IQ mismatch to be estimated without knowing one or more values of the phase shift, for example, by estimating or solving for the phase shift.

Some of the inventive principles relate to techniques for enhancing an estimate of a cross multiplication factor for a real-valued compensator (RVC) for the RX path of a quadrature transceiver. Some embodiments may begin with an initial estimate of the cross multiplication factor, and then adjust the cross multiplication factor by correcting for inaccuracies caused by one or more residual RX phase mismatches due to an incorrect initial estimate of the cross multiplication factor. In some embodiments, this may be accomplished by re-estimating one or more values of RX phase mismatch using, for example, one or more RVC compensated pilot signals and an estimated TX phase mismatch.

The principles disclosed herein may have independent utility and may be embodied individually, and not every embodiment may utilize every principle. Moreover, the principles may also be embodied in various combinations, some of which may amplify benefits of the individual principles in a synergistic manner.

Joint TX and RX Calibration

FIG. 1 illustrates an embodiment of a quadrature transceiver that may be used to implement joint TX and RX IQMM calibration according to this disclosure. The embodiment illustrated in FIG. 1 may include a TX path 100, an RX path 102, a loopback path 104, and a signal processing unit 106. The TX path 100 may include a pre-compensator 108, a digital-to-analog converter (DAC) 110, an up-converter 114, and a radio frequency (RF) transmission block 116. The RX path 102 may include an RF reception block 118, a down-converter 120, an analog-to-digital converter (ADC) 124, and a compensator 126. The signal processing unit 106 may include a signal generator 128, a signal capture unit 130, and a signal processor 132.

The loopback path 104 may be coupled between the TX path 100 and the RX path 102. The loopback path 104 may include a phase shifter, but in various embodiments, the phase shifter may alternatively be located in the TX path 100, in the RX path 102, or may have functionality distributed between multiple paths and/or components. In some embodiments, the phase shifter and/or phase shifting functionality may be located downstream the up-converter 114 and upstream of the down-converter 120. In some embodiments, some or all of the loopback path 104 may be integral with the TX path 100 and/or the RX path 102.

The TX path 100 and the RX path 102 may each include an I path and a Q path. Imbalances or mismatches between the I and Q paths (IQMM) may degrade system performance, for example, by creating interference between the mirror frequencies after down-conversion to baseband in the RX path 102 and/or after up-conversion to radio frequency (RF) or intermediate frequency (IF) in the TX path 100.

IQMM in the TX path 100 may be corrected by the IQMM pre-compensator 108, while IQMM in the RX path 102 may be corrected by the IQMM compensator 126.

Providing effective IQMM compensation, however, may involve obtaining accurate values of coefficients for the pre-compensator 108 and the compensator 126. Obtaining values of these coefficients may involve first determining values of IQMM parameters for the TX path 100 (TX-IQMM) and the RX path 102 (RX-IQMM). The TX-IQMM parameters may then be used to obtain coefficients for the pre-compensator 108, and the RX-IQMM parameters may be used to obtain coefficients for the compensator 126.

To determine values of IQMM parameters, one or more pilot signals (e.g., single-tone or multi-tone signals) may be sent through a pilot signal path which may include the TX path 100, the loopback path 104, and the RX path 102. The pilot signal received at the RX path 102 may have TX-IQMM and RX-IQMM parameters entangled with each other.

In some embodiments according to this disclosure. RX-IQMM may be estimated from the received pilot signals by ignoring TX-IQMM in the pilot signals. Likewise, TX-IQMM may be estimated by ignoring RX-IQMM in the pilot signals. These estimates may provide sufficient accuracy in some applications. However, in more demanding applications, performance may be degraded to an unacceptable level by ignoring the mismatch in one of the paths. For example, in some applications in which a common local oscillator (LO) may be used to provide both the $LO_{TX}$ signal to the up-converter 114 and the $LO_{RX}$ signal to the down-converter 120, the transmit signal may suffer from TX-IQMM, which may create an error in the estimation of coefficients for the RX compensator 126, which in turn, may degrade the receive path performance. Similarly, the received pilot signal may suffer from RX-IQMM which may create an error in the estimation of the coefficients for the TX pre-compensator 108 which may also degrade performance.

A further difficulty in determining TX and RX mismatch may arise from the frequency-dependency of some IQMM parameters. For example, in some applications, one or more filters/components in the up-converter 114 and or down-converter 120 may be frequency dependent.

In some embodiments according to this disclosure, two or more pilot signals (e.g., single-tone signals) may be sent through the pilot signal path which may include the TX path 100, the loopback path 104, and the RX path 102. Different phase shifts may be applied to different pilot signals, for example, by a phase shifter in the loopback path 104. This may enable the system to capture multiple independent observations at the receive path, for example, at both the principle frequency of the pilot signal and its mirror frequency, which may then be used to solve a system of equations (e.g., nonlinear equations) to jointly obtain estimates of both TX-IQMM parameters and RX-IQMM parameters from the same observations.

In some embodiments, the gain and/or phase shift applied by the phase shifter may be estimated as one or more unknowns in the system of equations. This may enable TX and RX IQMM parameters to be estimated without a priori knowledge of the phase shift.

Figure 2:
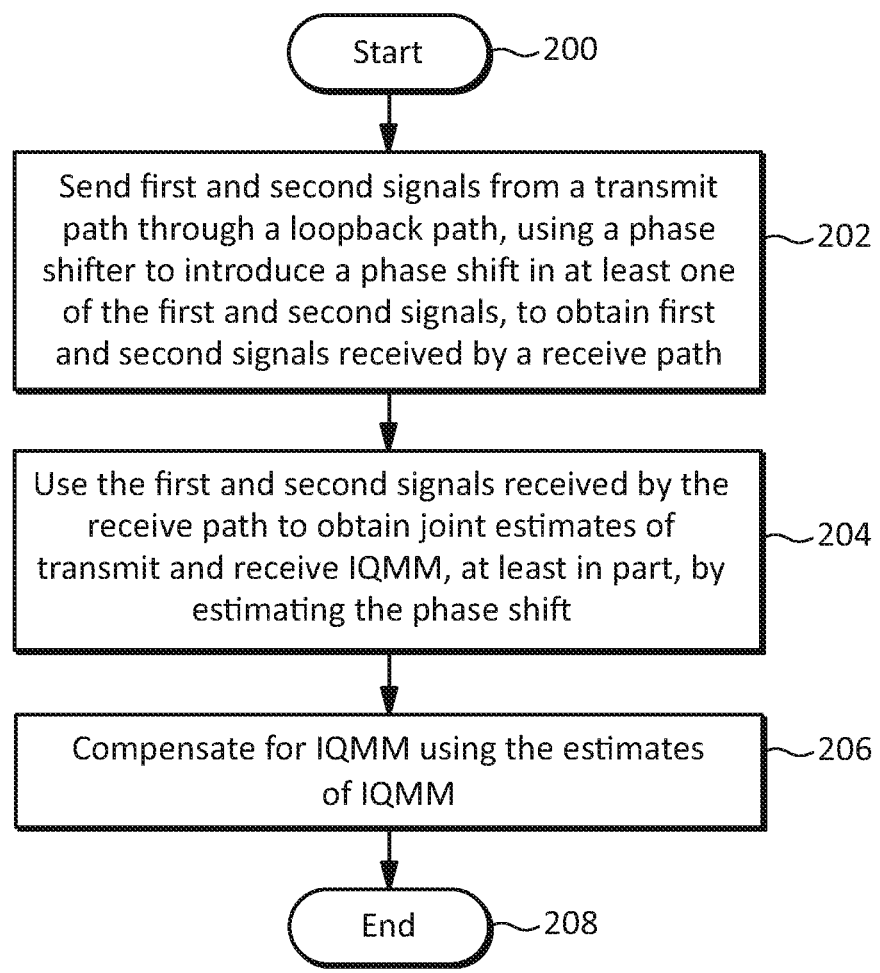
FIG. 2 illustrates an embodiment of a method compensating for IQMM in a transceiver according to this disclosure.

FIG. 2 illustrates an embodiment of a method compensating for IQMM in a transceiver according to this disclosure. The method illustrated in FIG. 2 may be used, for example, with the embodiment illustrated in FIG. 1. The method may begin at operation 200. At operation 202, the method may send first and second signals from a transmit path through a loopback path, using a phase shifter to introduce a phase shift in at least one of the first and second signals, to obtain first and second signals received by a receive path. At operation 204, the method may use the first and second signals received by the receive path to obtain joint estimates of transmit and receive IQMM, at least in part, by estimating the phase shift. At operation 206, the method may compensate for IQMM using the estimates of IQMM. The method may terminate at operation 208. In some embodiments, the method may additionally include sending a third signal from the transmit path through the loopback path, using the phase shifter to introduce a phase shift in at least two of the first, second, and third signals, to obtain a third signal received by the receive path, and using the first, second, and third signals received by the receive path to obtain joint estimates of the transmit and receive IQMM, at least in part, by estimating the phase shift.

The operations and/or components described with respect to the embodiments illustrated in FIGS. 1 and 2, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Referring again to FIG. 1, the RF transmission block 116 may include various components to transmit an RF signal such as an additional up-converter for a system having an architecture that may use intermediate frequency (IF) structures, as well as a power amplifier, a band-pass filter, an antenna, and/or the like. The RF reception block 118 may include various components to receive an RF signal such as an antenna, a band-pass filter, a low noise amplifier (LNA) and/or the like. In an IF system, the RF reception block 118 may further include an additional down-converter to convert an RF signal to IF.

Although various components illustrated in FIG. 1 are shown as individual components, in some embodiments, multiple components and/or their functionality may be combined into a smaller number of components. Likewise, a single component and/or its functionality may be distributed among, and/or integrated with, other components. For example, the signal generator 128 and/or signal capture unit 130 may be integrated with, and/or their functions may be performed by, one or more similar components in a modem that may be coupled to the transceiver shown in FIG. 1.

The components of the signal processing unit 106 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), state machines, data converters such as ADCs, DACs and/or the like. Full or partial software implementations may include one or more processor cores, memories, program and/or data storage, and/or the like, which may be located locally and/or remotely, and which may be programmed to execute instructions to perform one or more functions of the components of the signal processing unit 106.

In some embodiments, the processor 132 may manage and/or control the overall operation of the system illustrated in FIG. 1 including controlling the application of one or more pilot signals to the TX path 100, capturing observations one or more received pilot signals from the RX path 102, controlling the application of one or more phase shifts to a pilot signal, for example, through a phase control signal, performing calculations and/or offloading calculations to other resources, providing estimated coefficients to the TX pre-compensator 108 and the RX compensator 126, controlling the TX pre-compensator 108 and the RX compensator 126 during transmission and/or sending of pilot signals, for example, by disabling the pre-compensator 108 and/or the compensator 126, placing them in a transparent or pass-through state, and/or the like.

Some example embodiments of systems, processes, methods, and/or the like illustrating some possible implementation details according to this disclosure are described below. These examples are provided for purposes of illustrating the principles of this disclosure, but the principles are not limited to these embodiments, implementation details, and/or the like. For example, although the embodiment illustrated in FIG. 4 may be described in the context of a system that implements direct-conversion to RF (zero-IF), the principles may be applied to any other type of quadrature transceiver, for example, a system that may implement IF processing. As a further example, some embodiments may be described in the context of systems having a specific mix of digital and analog signals. However, the principles may also be applied to systems and/or methods having a different mix of digital and analog signals, as well as all analog implementations, and/or the like.

Figure 3:
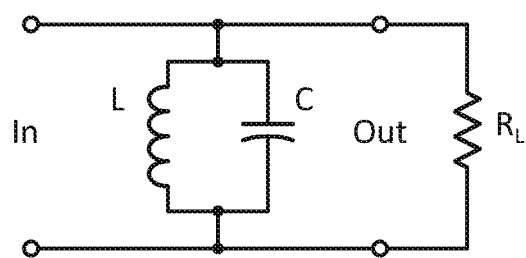
FIG. 3 illustrates an example embodiment of a phase shifter that may be used to apply a phase shift to one or more pilot signals according to this disclosure.

FIG. 3 illustrates an example embodiment of a phase shifter that may be used to apply a phase shift to one or more pilot signals according to this disclosure. The embodiment illustrated in FIG. 3 may include an inductor L and a capacitor C arranged in a parallel configuration with a load $R_L$. The phase shifter may be switched into and out of the pilot signal path to provide one or more phase shifts. The amount of phase shift may be controlled by switching one or more phase shifter circuits, switching and/or varying the values of one or more components, and/or the like. The embodiment illustrated in FIG. 3 may be located in the loopback path 104, in the TX path 100 and/or the RX path 102. The phase shifter may be located, for example, after the up-converter 114 and before the down-converter 120. In some implementations, the phase shifter may always be located after the up-converter 114 and before the down-converter 120.

Figure 4:
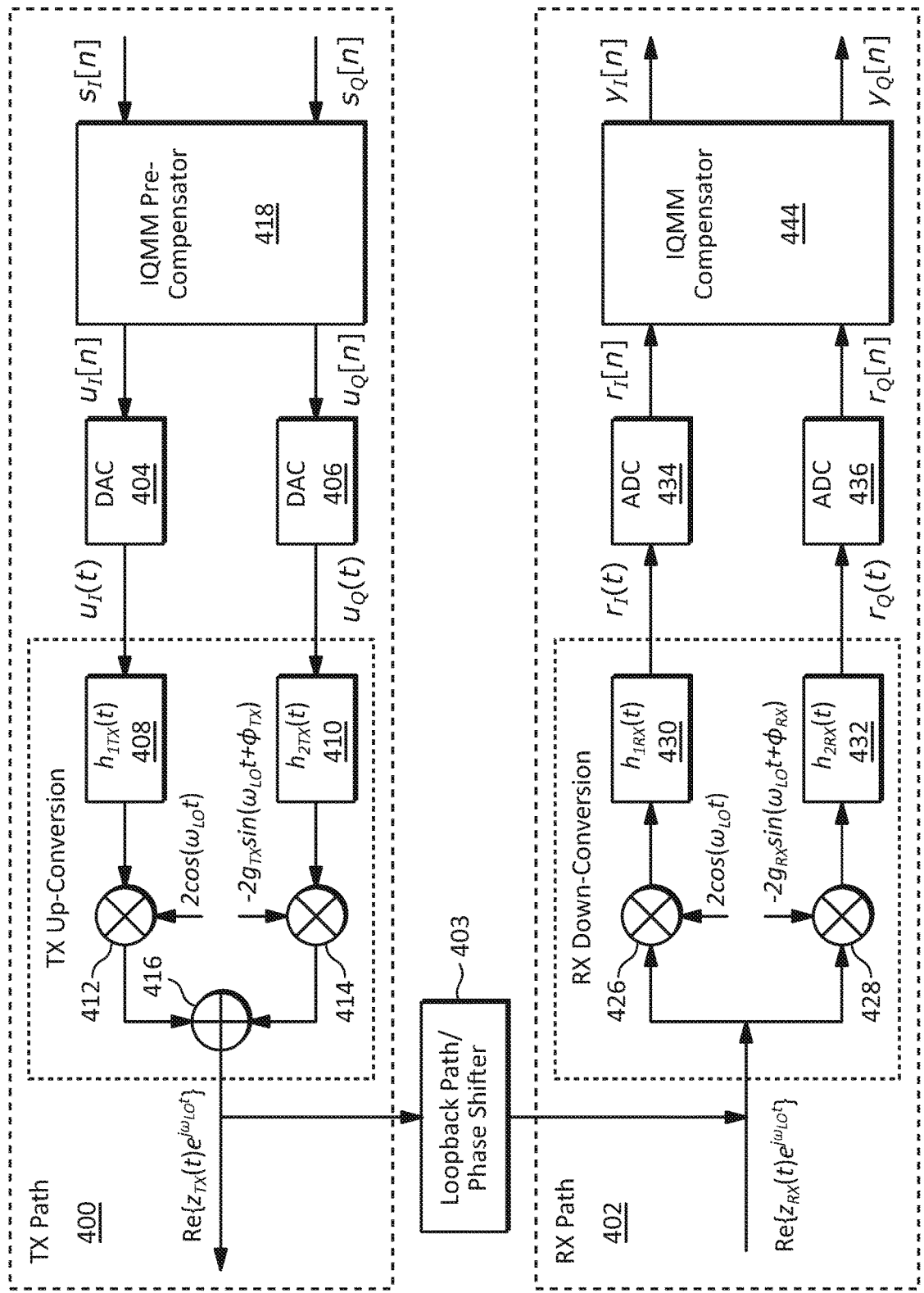
FIG. 4 illustrates an example embodiment of a quadrature transceiver that may be used to implement joint TX and RX calibration according to this disclosure.

FIG. 4 illustrates an example embodiment of a quadrature transceiver that may be used to implement joint TX and RX calibration according to this disclosure. The embodiment illustrated in FIG. 4 may include a TX path 400, an RX path 402, and a loopback path 403. The TX path 400 may include an I signal path including a DAC 404, a low-pass filter 408 having an impulse response $h_{1TX}(t)$, and a mixer 412. The TX path 400 may also include a Q signal path including a DAC 406, a low-pass filter 410 having an impulse response $h_{2TX}(t)$, and a mixer 414. The mixers 412, 414 and filters 408, 410, along with summing circuit 416, may collectively form an up-converter. The TX path 400 may further include an IQMM pre-compensator 418.

The RX path 402 may include an I signal path including a mixer 426, a low-pass filter 430 having an impulse response $h_{1RX}(t)$, and an ADC 434. The RX path 402 may also include a Q signal path including a mixer 428, a low-pass filter 432 having an impulse response $h_{2RX}(t)$, and an ADC 436. The mixers 426, 428 and filters 430, 432 may collectively form a down-converter. The RX path 402 may further include an IQMM compensator 444.

In the embodiment illustrated in FIG. 4, that same local oscillator (LO) may drive the mixers in both the TX path 400 and the RX path 402. In the TX path 400, $g_{TX} \neq 1$ and $\phi_{TX} \neq 0$ may denote the TX gain and phase mismatches, respectively, that may create frequency-independent IQ mismatch (FI-IQMM) at the up-converter. The mismatch between the overall impulse responses $h_{1TX}(t)$ and $h_{2TX}(t)$ may create frequency-dependent IQ mismatch (FD-IQMM) in the TX path, that is, $h_{1TX}(t) \neq h_{2TX}(t)$.

In the RX path 402, the gain and phase mismatches at the RX mixers 426 and 428 may be donated by $g_{RX} \neq 1$ and $\phi_{RX} \neq 0$, respectively, and may create the FI-IQMM at the down-converter. The FD-IQMM on RX path may be caused by mismatch between the impulse responses of $h_{1RX}(t)$ and $h_{2RX}(t)$.

IQMM Parameter Estimation (First Algorithm)

The baseband equivalent of the upconverted signal in the TX path 400 (at the output of mixers) in frequency-domain may be given by $$Z_{TX}(f) = G_{1TX}(f)U(f) + G_{2TX}(f)U^*(-f), \quad (1)$$

where $U(f)$ may be the frequency response of the clean IQMM-free signal at the input of the analog baseband (ABB) filters 408, 410 in the TX path, and $G_{1TX}(f)$ and $G_{2TX}(f)$ may be defined as $$G_{1TX}(f) = \frac{H_{1TX}(f) + g_{TX}e^{j\phi_{TX}}H_{2TX}(f)}{2}, \quad (2)$$

$$G_{2TX}(f) = \frac{H_{1TX}(f) - g_{TX}e^{j\phi_{TX}}H_{2TX}(f)}{2}.$$

In Equations (2), $H_{1TX}(f)$ and $H_{2TX}(f)$ may denote the frequency responses of filter 408 ($h_{1TX}(t)$) and filter 410 ($h_{2TX}(t)$), respectively. In Equation (1), $G_{1TX}(f)U(f)$ may represent a desired TX signal, and $G_{2TX}(f)U^*(-f)$ may represent a TX image signal. Without any IQMM, ($g_{TX}=1$, $\phi_{TX}=0$, and $h_{1TX}(t)=h_{2TX}(t)$), $G_{2TX}(f)$, and consequently, the second term in Equation (1) may become zero.

The effect of IQMM at the output of low-pass filters in the RX path 402 may be expressed as the addition of a filtered mirror image of the principal frequency and the ideal signal as follows $$R(f) = G_{1RX}(f)Z_{RX}(f) + G_{2RX}(f)Z_{RX}^*(-f), \quad (3)$$

where $R(f)$ may be the received signal at the output of ABB filters 430 and 432, $Z_{RX}(f)$ may be the baseband equivalent of the received signal at the input of the mixers 426 and 428, and $G_{1RX}(f)$ and $G_{2RX}(f)$ may be defined as $$G_{1RX}(f) = \frac{H_{1RX}(f) + g_{RX}e^{j\phi_{RX}}H_{2RX}(f)}{2}, \quad (4)$$

$$G_{2RX}(f) = \frac{H_{1RX}(f) - g_{RX}e^{j\phi_{RX}}H_{2RX}(f)}{2}.$$

In Equations (4), $H_{1RX}(f)$ and $H_{2RX}(f)$ may denote the frequency responses of filter 430 ($h_{1RX}(t)$) and filter 432 ($h_{2RX}(t)$), respectively. In Equation (3), $G_{1RX}(f)Z_{RX}(f)$ may represent a desired RX signal, and $G_{2RX}(f)Z_{RX}^*(-f)$ may represent interfering image signal due to RX IQMM.

Some embodiments according to this disclosure may obtain coefficients for the IQMM pre-compensator 418 that may fully or partially cancel the second term in Equation (1). Similarly, some embodiments according to this disclosure may obtain coefficients for the IQMM compensator 444 that may fully or partially cancel the second term in Equation (3).

To obtain coefficients that may compensate for the effects of IQMM in the TX path 400 and/or the RX path 402, some embodiments according to this disclosure may first estimate the IQMM parameters in TX path 400 and RX path 402 and then use the estimated parameters to obtain estimates of IQMM compensator coefficients for the TX and/or RX paths. An example embodiment of such a method may be described as follows.

A pilot signal may be generated and applied at baseband to the TX path 400, sent through the loopback path 403, and received at baseband in the RX path 402. In some embodiments, during the calibration phase, the captured observed signal received at the receive path may be assumed to only be coming from the loopback path, and thus, there may be no signal coming from upstream of the loopback path 403 shown in FIG. 4.

By using the same LO for the mixers in both the TX path 400 and the RX path 402, the received signal may be denoted by $R_{BB}(f)$ and may be given by $$R_{BB}(f) = A_{RX}G_{1RX}(f)\{G_{1TX}(f)U(f) + G_{2TX}(f)U^*(-f)\} + A_{RX}^*G_{2RX}(f)\{G_{1TX}^*(-f)U^*(-f) + G_{2TX}^*(-f)U(f)\}, \quad (5)$$

where $A_{RX}$ may denote the gain and delay from the RX ABB filter 430, 432 to the output of ADC 434, 436, and $U(f)$ may denote the frequency response of the signal at the input of TX ABB filters 408, 410. This may be used to estimate IQMM parameters, which may then be used to obtain IQMM compensator coefficients. To this end, parameters $G_{1RX}(\pm f)$, $G_{2RX}(\pm f)$, $G_{1TX}(\pm f)$, and $G_{2TX}(\pm f)$ in Equation (5) may be estimated at pre-selected frequencies $f=f_1, \ldots, f_K$. To estimate IQMM parameters at the preselected frequencies $\pm f_k$, a single-tone pilot signal at frequency $f_k$ may be generated and applied to the TX path 400 at baseband, upconverted and fed through the loopback path 403 and received at baseband of the RX path 402. A phase shift applied between the mixers in the TX and RX paths 400 and 402 may cause an arbitrary gain and/or phase shift, which may be frequency dependent, in the signal. In some embodiments, this phase shift may be applied anywhere after the mixers in the TX path 400 and before the mixers in the RX path 402.

The transmitted signal at frequency $f_k$ may be denoted by $U(f) = A_{TX}\delta(f-f_k)$, where $A_{TX}$ may be an unknown scaling factor that may account for gain and/or delay of the path between the TX baseband signal generation and input of the TX ABB filter 408, 410 ($h_{1TX}(t)$ and $h_{2TX}(t)$). One or more first observations may be made with a phase shift value $\theta_0$. Without loss of generality, and to simplify the resulting equations, the phase shift value may be set to $\theta_0=0$. However, any other unknown value may be used. The observations at the principal and mirror frequencies $f_k$ and $-f_k$ at the RX baseband may be denoted as $R_{1,k}$ and $R_{2,k}$. Another single-tone signal may be sent at frequency $-f_k$, for which observations at the principal and mirror frequencies $-f_k$ and $f_k$ may be denoted by $R_{3,k}$ and $R_{4,k}$ respectively. Next, single-tone signals at frequencies $f_k$ and $-f_k$ may be sent with applied phase shift values $\theta_1$ and $\theta_2$ separately to obtain eight additional observations denoted by $R_{5,k}, \ldots, R_{12,k}$, which may be given by $$R_{1,k} = A_{RX}A_{TX}G_{1RX}(f_k)G_{1TX}(f_k) + A_{RX}^*A_{TX}G_{2RX}(f_k)G_{2TX}^*(-f_k)$$

$$R_{2,k} = A_{RX}A_{TX}^*G_{1RX}(-f_k)G_{2TX}(-f_k) + A_{RX}^*A_{TX}^*G_{2RX}(-f_k)G_{1TX}^*(f_k)$$

$$R_{3,k} = A_{RX}A_{TX}^*G_{1RX}(-f_k)G_{1TX}(-f_k) + A_{RX}^*A_{TX}^*G_{2RX}(-f_k)G_{2TX}^*(f_k)$$

$$R_{4,k} = A_{RX}A_{TX}G_{1RX}(f_k)G_{2TX}(f_k) + A_{RX}^*A_{TX}G_{2RX}(f_k)G_{1TX}^*(-f_k)$$

$$R_{5,k} = \beta_{1,k}A_{RX}A_{TX}G_{1RX}(f_k)G_{1TX}(f_k) + \beta_{2,k}^*A_{RX}^*A_{TX}G_{2RX}(f_k)G_{2TX}^*(-f_k)$$

$$R_{6,k} = \beta_{2,k}A_{RX}A_{TX}^*G_{1RX}(-f_k)G_{2TX}(-f_k) + \beta_{1,k}^*A_{RX}^*A_{TX}G_{2RX}(-f_k)G_{1TX}^*(k)$$

$$R_{7,k} = \beta_{2,k}A_{RX}A_{TX}^*G_{1RX}(-f_k)G_{1TX}(-f_k) + \beta_{1,k}^*A_{RX}^*A_{TX}G_{2RX}(-f_k)G_{2TX}^*(f_k)$$

$$R_{8,k} = \beta_{1,k}A_{RX}A_{TX}G_{1RX}(f_k)G_{2TX}(f_k) + \beta_{2,k}^*A_{RX}^*A_{TX}G_{2RX}(f_k)G_{1TX}^*(-f_k)$$

$$R_{9,k} = \beta_{3,k}A_{RX}A_{TX}G_{1RX}(f_k)G_{1TX}(f_k) + \beta_{4,k}^*A_{RX}^*A_{TX}G_{2RX}(f_k)G_{1TX}^*(-f_k)$$

$$R_{10,k} = \beta_{4,k}A_{RX}A_{TX}^*G_{1RX}(-f_k)G_{2TX}(-f_k) + \beta_{3,k}^*A_{RX}^*A_{TX}G_{2RX}(-f_k)G_{1TX}^*(f_k)$$

$$R_{11,k} = \beta_{4,k}A_{RX}A_{TX}^*G_{1RX}(-f_k)G_{1TX}(-f_k) + \beta_{3,k}^*A_{RX}^*A_{TX}G_{2RX}(-f_k)G_{2TX}^*(k)$$

$$R_{12,k} = \beta_{3,k}A_{RX}A_{TX}G_{1RX}(f_k)G_{2TX}(f_k) + \beta_{4,k}^*A_{RX}^*A_{TX}G_{2RX}(f_k)G_{1TX}^*(-f_k) \quad (6)$$

where $\beta_{1,k}, \ldots, \beta_{4,k}$ account for phase and/or gain change due to a phase shifter. Different factors may be used for positive and negative frequencies since the phase shifter may not have a symmetric frequency response around the center frequency. However, the phase shifter effect in the first four equations of Equations (6) may be omitted since any gain and phase variation may be absorbed by $G_{1TX}(\pm f_k)$ and $G_{2TX}(\pm f_k)$ in Equations (6). In some embodiments, Equations (6) may include one or more nonlinear equations.

FIG. 5 provides example embodiments of spectral plots of transmitted and captured (observed) signals corresponding to the Equations (6).

In some embodiments, $A_{RX}$ and/or $A_{TX}$ may account, for example, for gain and delay effects related to the DAC 404, 406, and/or ADC 434, 436, such as up sampling, down sampling, anti-aliasing filtering, and/or the like. In some embodiments, $\beta_{1,k}, \ldots, \beta_{4,k}$ may be related to the phase and/or gain change due to a phase shifter such that $\beta = re^{j\theta}$ where r may represent a gain of a phase shifter and $\theta$ may represent a phase change due to the phase shifter.

The following parameters may be defined $$\gamma_{1,k} \triangleq A_{TX} G_{1TX}(f_k), \gamma_{2,k} \triangleq A_{TX} G_{2TX}^*(-f_k),$$

$$\gamma_{3,k} \triangleq A_{TX}^* G_{1TX}(-f_k), \gamma_{4,k} \triangleq A_{TX}^* G_{2TX}^*(f_k),$$

$$\gamma_{5,k} \triangleq A_{RX} G_{1RX}(f_k), \gamma_{6,k} \triangleq A_{RX}^* G_{2RX}(f_k),$$

$$\gamma_{7,k} \triangleq A_{RX} G_{1RX}(-f_k), \gamma_{8,k} \triangleq A_{RX}^* G_{2RX}(-f_k). \quad (7)$$

Observations at principal and mirror frequencies may then be rewritten as follows $$R_{1,k} = \gamma_{1,k}\gamma_{5,k} + \gamma_{2,k}\gamma_{6,k}$$

$$R_{2,k} = \gamma_{2,k}^*\gamma_{7,k} + \gamma_{1,k}^*\gamma_{8,k}$$

$$R_{3,k} = \gamma_{3,k}\gamma_{7,k} + \gamma_{4,k}\gamma_{8,k}$$

$$R_{4,k} = \gamma_{4,k}^*\gamma_{5,k} + \gamma_{3,k}^*\gamma_{6,k}$$

$$R_{5,k} = \beta_{1,k}\gamma_{1,k}\gamma_{5,k} + \beta_{2,k}^*\gamma_{2,k}\gamma_{6,k}$$

$$R_{6,k} = \beta_{2,k}\gamma_{2,k}^*\gamma_{7,k} + \beta_{1,k}^*\gamma_{1,k}^*\gamma_{8,k}$$

$$R_{7,k} = \beta_{2,k}\gamma_{3,k}\gamma_{7,k} + \beta_{1,k}^*\gamma_{4,k}\gamma_{8,k}$$

$$R_{8,k} = \beta_{1,k}\gamma_{4,k}^*\gamma_{5,k} + \beta_{2,k}^*\gamma_{3,k}^*\gamma_{6,k}$$

$$R_{9,k} = \beta_{3,k}\gamma_{1,k}\gamma_{5,k} + \beta_{4,k}^*\gamma_{2,k}\gamma_{6,k}$$

$$R_{10,k} = \beta_{4,k}\gamma_{1,k}^*\gamma_{5,k} + \beta_{4,k}^*\gamma_{1,k}^*\gamma_{8,k}$$

$$R_{11,k} = \beta_{4,k}\gamma_{3,k}\gamma_{7,k} + \beta_{3,k}^*\gamma_{4,k}\gamma_{8,k}$$

$$R_{12,k} = \beta_{3,k}\gamma_{4,k}^*\gamma_{5,k} + \beta_{4,k}^*\gamma_{3,k}^*\gamma_{6,k}. \quad (8)$$

Thus, Equations (8) may provide 12 complex equations with 12 complex unknowns. In some embodiments, the phases $\theta_0$, $\theta_1$, and $\theta_2$ may be distinct (e.g., may have sufficient spacing) such that $\beta_{1,k}, \ldots, \beta_{4,k}$ may be sufficiently different from 1 and from each other so that the Equations (8) represent independent observations.

For a given set of observations $R_{1,k}, \ldots, R_{12,k}$, the problem of solving $\gamma_{1,k}, \ldots, \gamma_{8,k}, \beta_{1,k}, \ldots, \beta_{4,k}$ may be formulated as follows $$x^{opt} = \arg \min_{x \in \mathbb{C}^{12}} \|f(x)\|^2, \quad (9)$$

$$f(x) = \begin{bmatrix} \gamma_{1,k}\gamma_{5,k} + \gamma_{2,k}\gamma_{6,k} - R_{1,k} \\ \gamma_{2,k}^*\gamma_{7,k} + \gamma_{1,k}^*\gamma_{8,k} - R_{2,k} \\ \gamma_{3,k}\gamma_{7,k} + \gamma_{4,k}\gamma_{8,k} - R_{3,k} \\ \gamma_{4,k}^*\gamma_{5,k} + \gamma_{3,k}^*\gamma_{6,k} - R_{4,k} \\ \beta_{1,k}\gamma_{1,k}\gamma_{5,k} + \beta_{2,k}^*\gamma_{2,k}\gamma_{6,k} - R_{5,k} \\ \beta_{2,k}\gamma_{2,k}^*\gamma_{7,k} + \beta_{1,k}^*\gamma_{1,k}^*\gamma_{8,k} - R_{6,k} \\ \beta_{2,k}\gamma_{3,k}\gamma_{7,k} + \beta_{1,k}^*\gamma_{4,k}\gamma_{8,k} - R_{7,k} \\ \beta_{1,k}\gamma_{4,k}^*\gamma_{5,k} + \beta_{2,k}^*\gamma_{3,k}^*\gamma_{6,k} - R_{8,k} \\ \beta_{3,k}\gamma_{1,k}\gamma_{5,k} + \beta_{4,k}^*\gamma_{2,k}\gamma_{6,k} - R_{9,k} \\ \beta_{4,k}\gamma_{2,k}^*\gamma_{7,k} + \beta_{3,k}^*\gamma_{1,k}^*\gamma_{8,k} - R_{10,k} \\ \beta_{4,k}\gamma_{3,k}\gamma_{7,k} + \beta_{3,k}^*\gamma_{4,k}\gamma_{8,k} - R_{11,k} \\ \beta_{3,k}\gamma_{4,k}^*\gamma_{5,k} + \beta_{4,k}^*\gamma_{3,k}^*\gamma_{6,k} - R_{12,k} \end{bmatrix}$$

where the vector of unknowns may be given by $$x = [\gamma_{1,k}, \ldots, \gamma_{8,k}, \beta_{1,k}, \ldots, \beta_{4,k}]^T. \quad (10)$$

The problem represented by Equations (9) may be solved, for example, using a block coordinate descent (BCD) algorithm, which may minimize the cost function $\|f(x)\|^2$ iteratively along a coordinate block while the other coordinates remain fixed.

In some embodiments using this method, descent in the cost function may be ensured at every iteration. In the BCD algorithm, the unknown variables may be divided into the following three blocks $$x_1 = [\gamma_{5,k}, \gamma_{6,k}, \gamma_{7,k}, \gamma_{8,k}]^T,$$

$$x_2 = [\gamma_{1,k}, \gamma_{2,k}, \gamma_{3,k}, \gamma_{4,k}]^T,$$

$$x_3 = [\beta_{1,k}, \beta_{2,k}, \beta_{3,k}, \beta_{4,k}]^T. \quad (11)$$

Each iteration of the BCD solver may consist of three steps (i=1,2,3). At the ith step of the $(\ell+1)$th iteration, $\|f(x_1^{(\ell+1)}, \ldots, x_{i-1}^{(\ell+1)}, x_i, x_{i+1}^{(\ell)}, \ldots, x_3^{(\ell)})\|^2$ may be minimized with respect to $x_i$. With the specific choice of coordinate blocks in Equations (11), the cost function at the ith step may become a least squares (LS) problem in terms of $x_i$, which may be readily solved.

The following parameters may be defined $$A_1^{(\ell)} = \begin{bmatrix} \gamma_{1,k}^{(\ell)} & \gamma_{2,k}^{(\ell)} \\ \gamma_{4,k}^{(\ell)*} & \gamma_{3,k}^{(\ell)*} \\ \beta_{1,k}^{(\ell)}\gamma_{1,k}^{(\ell)} & \beta_{2,k}^{(\ell)}\gamma_{2,k}^{(\ell)} \\ \beta_{1,k}^{(\ell)}\gamma_{4,k}^{(\ell)*} & \beta_{2,k}^{(\ell)*}\gamma_{3,k}^{(\ell)*} \\ \beta_{3,k}^{(\ell)}\gamma_{1,k}^{(\ell)} & \beta_{4,k}^{(\ell)*}\gamma_{2,k}^{(\ell)} \\ \beta_{3,k}^{(\ell)}\gamma_{4,k}^{(\ell)*} & \beta_{4,k}^{(\ell)*}\gamma_{3,k}^{(\ell)*} \end{bmatrix}, \quad (12)$$

$$A_2^{(\ell)} = \begin{bmatrix} \gamma_{2,k}^{(\ell)} & \gamma_{1,k}^{(\ell)} \\ \gamma_{4,k}^{(\ell)*} & \gamma_{3,k}^{(\ell)*} \\ \beta_{1,k}^{(\ell)}\gamma_{1,k}^{(\ell)} & \beta_{2,k}^{(\ell)}\gamma_{2,k}^{(\ell)} \\ \beta_{1,k}^{(\ell)}\gamma_{4,k}^{(\ell)*} & \beta_{2,k}^{(\ell)*}\gamma_{3,k}^{(\ell)*} \\ \beta_{3,k}^{(\ell)}\gamma_{1,k}^{(\ell)} & \beta_{4,k}^{(\ell)*}\gamma_{2,k}^{(\ell)} \\ \beta_{3,k}^{(\ell)}\gamma_{4,k}^{(\ell)*} & \beta_{4,k}^{(\ell)*}\gamma_{3,k}^{(\ell)*} \end{bmatrix},$$

-continued $$\beta_1^{(\ell)} = \begin{bmatrix} \gamma_{1,k}^{(\ell+1)} & \gamma_{6,k}^{(\ell+1)} \\ \gamma_{8,k}^{(\ell+1)*} & \gamma_{7,k}^{(\ell+1)*} \\ \beta_{1,k}^{(\ell)}\gamma_{5,k}^{(\ell+1)} & \beta_{2,k}^{(\ell)*}\gamma_{6,k}^{(\ell+1)} \\ \beta_{1,k}^{(\ell)}\gamma_{8,k}^{(\ell+1)*} & \beta_{2,k}^{(\ell)*}\gamma_{7,k}^{(\ell+1)*} \\ \beta_{3,k}^{(\ell)}\gamma_{5,k}^{(\ell+1)} & \beta_{4,k}^{(\ell)*}\gamma_{6,k}^{(\ell+1)} \\ \beta_{3,k}^{(\ell)}\gamma_{8,k}^{(\ell+1)*} & \beta_{4,k}^{(\ell)*}\gamma_{7,k}^{(\ell+1)*} \end{bmatrix}, \quad (13)$$

$$\beta_2^{(\ell)} = \begin{bmatrix} \gamma_{7,k}^{(\ell+1)} & \gamma_{8,k}^{(\ell+1)} \\ \gamma_{k,6}^{(\ell+1)*} & \gamma_{5,k}^{(\ell+1)*} \\ \beta_{2,k}^{(\ell)}\gamma_{7,k}^{(\ell+1)} & \beta_{1,k}^{(\ell)*}\gamma_{8,k}^{(\ell+1)} \\ \beta_{2,k}^{(\ell)}\gamma_{6,k}^{(\ell+1)*} & \beta_{1,k}^{(\ell)*}\gamma_{5,k}^{(\ell+1)*} \\ \beta_{4,k}^{(\ell)}\gamma_{7,k}^{(\ell+1)} & \beta_{3,k}^{(\ell)*}\gamma_{8,k}^{(\ell+1)} \\ \beta_{4,k}^{(\ell)}\gamma_{6,k}^{(\ell+1)*} & \beta_{3,k}^{(\ell)*}\gamma_{5,k}^{(\ell+1)*} \end{bmatrix},$$

$$C^{(\ell)} = \begin{bmatrix} \gamma_{1,k}^{(\ell+1)}\gamma_{5,k}^{(\ell+1)} & j\gamma_{2,k}^{(\ell+1)}\gamma_{6,k}^{(\ell+1)} & \gamma_{2,k}^{(\ell+1)}\gamma_{6,k}^{(\ell+1)} & -j\gamma_{2,k}^{(\ell+1)}\gamma_{6,k}^{(\ell+1)} \\ \gamma_{1,k}^{(\ell+1)*}\gamma_{8,k}^{(\ell+1)} & -j\gamma_{1,k}^{(\ell+1)*}\gamma_{8,k}^{(\ell+1)} & \gamma_{2,k}^{(\ell+1)}\gamma_{7,k}^{(\ell+1)} & j\gamma_{2,k}^{(\ell+1)}\gamma_{7,k}^{(\ell+1)} \\ \gamma_{4,k}^{(\ell+1)*}\gamma_{8,k}^{(\ell+1)} & -j\gamma_{4,k}^{(\ell+1)*}\gamma_{8,k}^{(\ell+1)} & \gamma_{3,k}^{(\ell+1)*}\gamma_{7,k}^{(\ell+1)} & j\gamma_{3,k}^{(\ell+1)*}\gamma_{7,k}^{(\ell+1)} \\ \gamma_{4,k}^{(\ell+1)*}\gamma_{5,k}^{(\ell+1)} & j\gamma_{4,k}^{(\ell+1)*}\gamma_{5,k}^{(\ell+1)} & \gamma_{3,k}^{(\ell+1)*}\gamma_{6,k}^{(\ell+1)} & -j\gamma_{3,k}^{(\ell+1)*}\gamma_{6,k}^{(\ell+1)} \end{bmatrix}, \quad (14)$$

$$R_{A_1} = [R_{1,k}, R_{4,k}, R_{5,k}, R_{8,k}, R_{9,k}, R_{12,k}]^T, \quad (15)$$

$$R_{A_2} = [R_{2,k}, R_{3,k}, R_{6,k}, R_{7,k}, R_{10,k}, R_{11,k}]^T,$$

$$R_{B_1} = [R_{1,k}, R_{2,k}^*, R_{5,k}, R_{6,k}^*, R_{9,k}, R_{10,k}^*]^T,$$

$$R_{B_2} = [R_{3,k}, R_{4,k}^*, R_{7,k}, R_{8,k}^*, R_{11,k}, R_{12,k}^*]^T,$$

$$R_{C_1} = [R_{5,k}, R_{6,k}, R_{7,k}, R_{8,k}]^T,$$

$$R_{C_2} = [R_{9,k}, R_{10,k}, R_{11,k}, R_{12,k}]^T.$$

These parameters may then be used to solve Equations (9) using a BCD solver procedure as summarized in Table 1.

TABLE 1

1  Choose initial guess $x^{(0)} \in \mathbb{C}^{12}$
2  For $\ell = 0$ to $iter_{max} - 1$ reapeat,
   a. Obtain $\gamma_{5,k}^{(\ell+1)}, \gamma_{6,k}^{(\ell+1)}, \gamma_{7,k}^{(\ell+1)}$, and $\gamma_{8,k}^{(\ell+1)}$ as follows $$\begin{bmatrix} \gamma_{5,k}^{(\ell+1)} \\ \gamma_{6,k}^{(\ell+1)} \end{bmatrix} = pinv(A_1^{(\ell)})R_{A_1}, \begin{bmatrix} \gamma_{7,k}^{(\ell+1)} \\ \gamma_{8,k}^{(\ell+1)} \end{bmatrix} = pinv(A_2^{(\ell)})R_{A_2}$$

b. Obtain $\gamma_{1,k}^{(\ell+1)}, \gamma_{2,k}^{(\ell+1)}, \gamma_{3,k}^{(\ell+1)}$, and $\gamma_{4,k}^{(\ell+1)}$ as follows $$\begin{bmatrix} \gamma_{1,k}^{(\ell+1)} \\ \gamma_{2,k}^{(\ell+1)} \end{bmatrix} = pinv(B_1^{(\ell)})R_{B_1}, \begin{bmatrix} \gamma_{3,k}^{(\ell+1)} \\ \gamma_{3,k}^{(\ell+1)} \end{bmatrix} = pinv(B_2^{(\ell)})R_{B_2}$$

c. Obtain $\beta_{1,k}^{(\ell+1)}, \ldots, \beta_4^{(\ell+1)}$ as follows
$\beta_{1,k}^{(\ell+1)} = [1, 1j, 0, 0] \times (pinv(C^{(\ell)})R_{C_1})$,
$\beta_{2,k}^{(\ell+1)} = [0, 0, 1, 1j] \times (pinv(C^{(\ell)})R_{C_1})$,
$\beta_{3,k}^{(\ell+1)} = [1, 1j, 0, 0] \times (pinv(C^{(\ell)})R_{C_2})$,
$\beta_{4,k}^{(\ell+1)} = [0, 0, 1, 1j] \times (pinv(C^{(\ell)})R_{C_2})$ To speed up the convergence of BCD solver in Table 1, the final solution $x^{(iter_{max})}$ of a frequency tone may be used as an initial point of the next adjacent tone $(x^{(0)})$ since the IQMM parameters of the adjacent tones (if the tones are relatively close to each other in frequency) may be similar.

In some embodiments, Equations (6) may be formulated in different manners, and/or different methods may be used to solve Equations (9), for example, gradient descent or Newton's method.

TX Pre-Compensation

In some embodiments, estimates of $\gamma_{1,k}, \ldots, \gamma_{4,k}$ for $k=1, \ldots, K$, obtained using, for example, the techniques described above, may be used to obtain estimates of coefficients for a TX pre-compensator such as the pre-compensator 418 illustrated in FIG. 4. An example of a pre-compensator for which coefficients may be estimated according to this disclosure is illustrated in FIG. 6.

Figure 6:
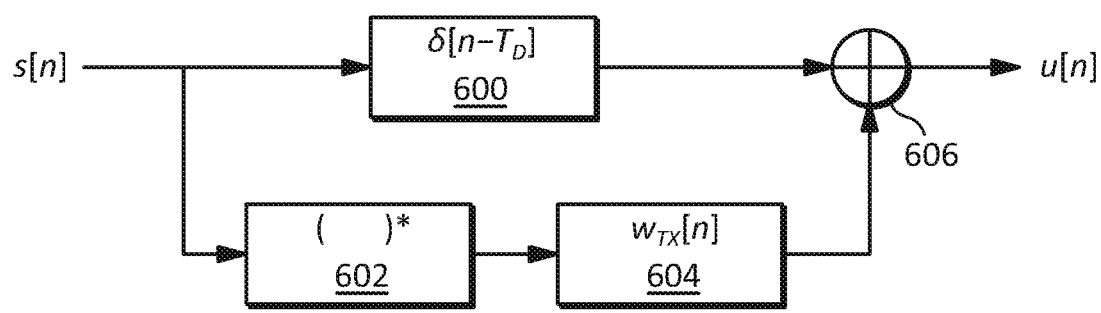
FIG. 6 illustrates an example embodiment of a complex-valued pre-compensator (CVPC) according to this disclosure.

FIG. 6 illustrates an example embodiment of a complex-valued pre-compensator (CVPC) according to this disclosure. The embodiment illustrated in FIG. 6 may include an integer delay element 600 having a delay $T_D$, a complex conjugate block 602, a complex-valued filter 604 having an impulse response $w_{TX}[n]$, and a summing circuit 606.

Values for coefficients that may fully or partially remove TX FD-IQMM from the TX path 400 illustrated in FIG. 4 for the pre-compensator illustrated in FIG. 6 may then be given by $$W_{TX}^{opt}(f) = -\frac{G_{2TX}(f)}{G_{1TX}(f)} e^{-j2\pi f T_D}. \quad (16)$$

where $W_{TX}(f)$ denotes the frequency responses of filter $w_{TX}[n]$.

In some embodiments, and depending on the implementation details, the methods, expressions, and/or the like disclosed herein may provide optimal values, and thus, the designator "opt" may be used. However, the inventive principles are not limited to embodiments in which optimal values may be obtained, and the use of "opt" or "optimal" is not limited to methods, expressions, and/or the like that my provide optimal values.

For a given delay element $T_D$, $W_{TX}^{opt}$ may be estimated at frequencies $f=\pm f_1, \ldots, \pm f_K$ as $$\hat{W}_{TX}^{opt}(f_k) = -\frac{\gamma_{4,k}^*}{\gamma_{1,k}} e^{-j2\pi \frac{f_k}{F_s} T_D}, \quad (17)$$

$$\hat{W}_{TX}^{opt}(-f_k) = -\frac{\gamma_{2,k}^*}{\gamma_{3,k}} e^{j2\pi \frac{f_k}{F_s} T_D},$$

where $F_s$ may be the sampling rate over which the pre-compensation block is operating.

In some embodiments, a finite impulse response (FIR) filter 604 ($w_{TX}[n]$) of length L may be used in the embodiment illustrated in FIG. 6 to obtain an L-tap filter $w_{TX}=[w_{TX}[0], \ldots, w_{TX}[L-1]]^T \in \mathbb{C}^{L \times 1}$ that may reduce or minimize the least squared (LS) error between $W_{TX}(f)$ and $\hat{W}_{TX}^{opt}(f)$ at frequencies $f=\pm f_1, \ldots, \pm f_K$ as $$\min_{w_{TX}, T_D} \|\hat{W}_{opt} - Fw_{TX}\|^2, \quad (18)$$

where $\hat{W}_{opt} = [\hat{W}_{TX}^{opt}(-f_K), \ldots, \hat{W}_{TX}^{opt}(-f_1), \hat{W}_{TX}^{opt}(f_1), \ldots, \hat{W}_{TX}^{opt}(f_K)]^T$ and $F=[F_0, \ldots, F_{L-1}]$ may be a Discrete Fourier Transform (DFT) matrix of size $2K \times L$, wherein $T_D$ may take values in $\{0, \ldots, L-1\}$. For a fixed $T_D$, $w_{TX}$ may be found as $\hat{w}_{TX,T_D} = \text{pinv}(F)\hat{W}_{opt}$ with a least squared error of $LSE_{T_D} = \|\hat{W}_{opt} - F\hat{w}_{TX,TD}\|^2$. Then $T_D$ and filter coefficients $\hat{w}_{TX}^{opt}$ may be given by $$T_D^{opt} = \underset{T_D}{\operatorname{argmin}} LSE_{T_D}, \quad \hat{w}_{TX}^{opt} = \hat{w}_{TX,T_D^{opt}}. \tag{19}$$

In some embodiments, and depending on the implementation details, this process may provide an optimal L-tap filter and/or optimal values for $T_D$ and filter coefficients $\hat{w}_{TX}^{opt}$.

In some embodiments, other pre-compensator structures may be used, and the calibration algorithm may be applied to other IQ mismatch pre-compensation structures as well. Furthermore, techniques other than LS may be used to obtain filter coefficients for the pre-compensation structures.

RX Compensation

In some embodiments, estimates of $\gamma_{5,k}, \ldots, \gamma_{8,k}$ for $k=1, \ldots, K$, obtained using, for example, the techniques described above, may be used to obtain estimates of coefficients for an RX compensator such as the compensator 444 illustrated in FIG. 4. Some examples of compensators for which estimates of coefficients may be obtained according to this disclosure include complex valued compensators (CVC) such as those illustrated in FIGS. 7 and 8 and real-valued compensators such as that illustrated in FIG. 9 Alternatively, the estimates of $\gamma_{5,k}, \ldots, \gamma_{8,k}$ for $k=1, \ldots, K$ may be used to compensate IQMM in frequency-domain rather than time-domain, for example, compensation of IQMM in orthogonal frequency-division multiplexing (OFDM) systems.

Figure 7:
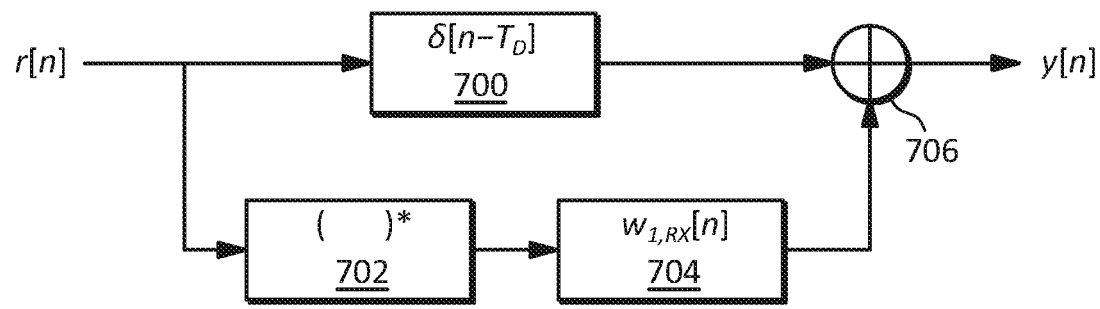
FIG. 7 illustrates an example embodiment of a complex-valued compensator (CVC) according to this disclosure.

FIG. 7 illustrates an example embodiment of a CVC according to this disclosure. The embodiment illustrated in FIG. 7 may include an integer delay element 700 having a delay $T_D$, a complex conjugate block 702, a complex-valued filter 704 having an impulse response $w_{1,RX}[n]$, and a summing circuit 706.

Figure 8:
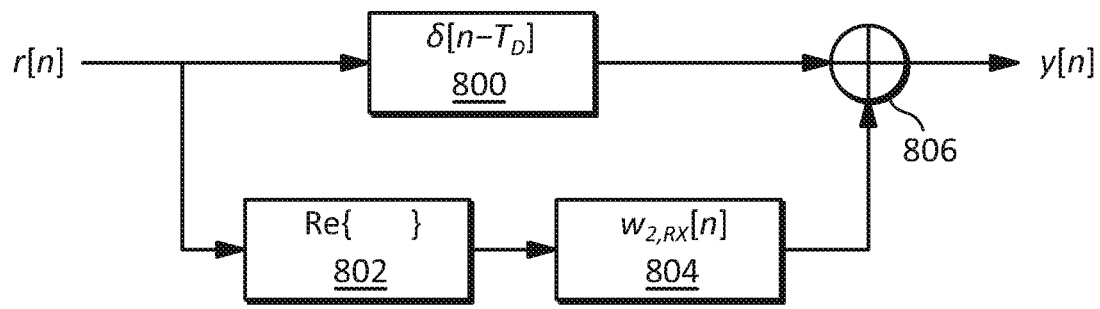
FIG. 8 illustrates another example embodiment of a CVC according to this disclosure.

FIG. 8 illustrates another example embodiment of a complex-valued compensator (CVC) according to this disclosure. The embodiment illustrated in FIG. 8 may include an integer delay element 800 having a delay $T_D$, a real value block 802, a complex-valued filter 804 having an impulse response $w_{2,RX}[n]$, and a summing circuit 806.

Figure 9:
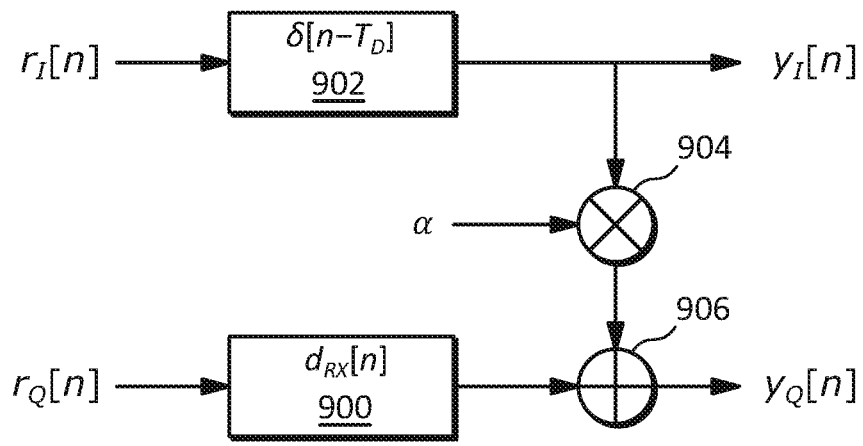
FIG. 9 illustrates an example embodiment of a real-valued compensator (RVC) according to this disclosure.

FIG. 9 illustrates an example embodiment of a real-valued compensator (RVC) according to this disclosure. The embodiment illustrated in FIG. 9 may include a real-valued filter 900 having an impulse response $d_{RX}[n]$, an integer delay element 902 having a delay $T_D$, a real-valued cross multiplication factor $\alpha$, a multiplier 904 and a summing circuit 906.

Compensator coefficients that may reduce or remove RX FD-IQMM for the complex-valued compensators illustrated in FIGS. 7 and 8 may be given by $$W_{1,RX}^{opt}(f) = -\frac{G_{2RX}(f)}{G_{1RX}^*(-f)} e^{-j2\pi f T_D}, \tag{20}$$

$$W_{2,RX}^{opt}(f) = -\frac{2G_{2RX}(f)}{G_{1RX}^*(-f) + G_{2RX}(f)} e^{-j2\pi f T_D},$$

where $W_{1,RX}(f)$ and $W_{2,RX}(f)$ may denote the frequency responses of filters 704 ($w_{1,RX}[n]$) and 804 ($w_{2,RX}[n]$), respectively.

For the RVC illustrated in FIG. 9, a method may begin by defining $$R(f) \triangleq \frac{G_{1RX}(f) + G_{2RX}^*(-f)}{G_{1RX}(f) - G_{2RX}^*(-f)}.$$

Compensator coefficients that reduce or remove RX FD-IQMM may then be given by $$\alpha_{RX}^{opt} = \tan\phi_{RX} = \tan\left(\frac{1}{2} \times \angle\left(\frac{R(f)}{R^*(-f)}\right)\right), \tag{21}$$

$$D_{RX}^{opt}(f) = \frac{1}{g_{RX}\cos\phi_{RX}} \frac{H_{1RX}(f)}{H_{2RX}(f)} e^{-j2\pi f T_D} = (1 - j\alpha^{opt})R(f)e^{-j2\pi f T_D},$$

where $\angle$ may denote the angle operator, and $D_{RX}(f)$ may denote the frequency response of filter 900 ($d_{RX}$).

In some embodiments, and depending on the implementation details, the expressions in Equations (20) and/or (21), may provide optimal values.

In some embodiments, after obtaining estimates of $\gamma_{5,k}$, $\gamma_{6,k}$, $\gamma_{7,k}$, and $\gamma_{8,k}$ for $k=1, \ldots, K$, Equations (20) and (21) may be used to obtain the coefficients for the compensators illustrated in FIGS. 7-9 (for a given $T_D$) at selected frequencies as follows $$\hat{W}_{1,RX}^{opt}(f_k) = -\frac{\gamma_{6,k}}{\gamma_{7,k}^*} e^{-j2\pi \frac{f_k}{F_s} T_D}, \tag{22}$$

$$\hat{W}_{1,RX}^{opt}(-f_k) = -\frac{\gamma_{8,k}}{\gamma_{5,k}^*} e^{j2\pi \frac{f_k}{F_s} T_D},$$

$$\hat{W}_{2,RX}^{opt}(f_k) = -\frac{2\gamma_{6,k}}{\gamma_{7,k}^* + \gamma_{6,k}} e^{-j2\pi \frac{f_k}{F_s} T_D},$$

$$\hat{W}_{2,RX}^{opt}(-f_k) = -\frac{2\gamma_{8,k}}{\gamma_{5,k}^* + \gamma_{8,k}} e^{j2\pi \frac{f_k}{F_s} T_D},$$

$$\hat{\alpha}_{RX}^{opt} = \tan\left(\frac{1}{2} \times \sum_{k=1}^{K} \angle\left(\frac{\hat{R}(f_k)}{\hat{R}^*(-f_k)}\right)\right),$$

$$\hat{D}_{RX}^{opt}(f_k) = (1 - j\hat{\alpha}_{RX}^{opt})\hat{R}(f_k)e^{j2\pi \frac{f_k}{F_s} T_D},$$

$$\hat{D}_{RX}^{opt}(-f_k) = (1 - j\hat{\alpha}_{RX}^{opt})\hat{R}(-f_k)e^{j2\pi \frac{f_k}{F_s} T_D},$$

$$\text{where } \hat{R}(f_k) = \frac{\gamma_{5,k} + \gamma_{8,k}^*}{\gamma_{5,k} - \gamma_{8,k}^*}, \tag{23}$$

$$\hat{R}(-f_k) = \frac{\gamma_{7,k} + \gamma_{6,k}^*}{\gamma_{7,k} - \gamma_{6,k}^*}.$$

To obtain values for filters 704 ($w_{1,RX}[n]$), 804 ($w_{2,RX}[n]$), and 900 ($d_{RX}[n]$), a least squares approach as described above may be used to obtain an FIR approximation of the filter responses $W_{1,RX}^{opt}(f)$, $W_{2,RX}^{opt}(f)$, and/or $D_{RX}^{opt}(f)$.

Figure 10:
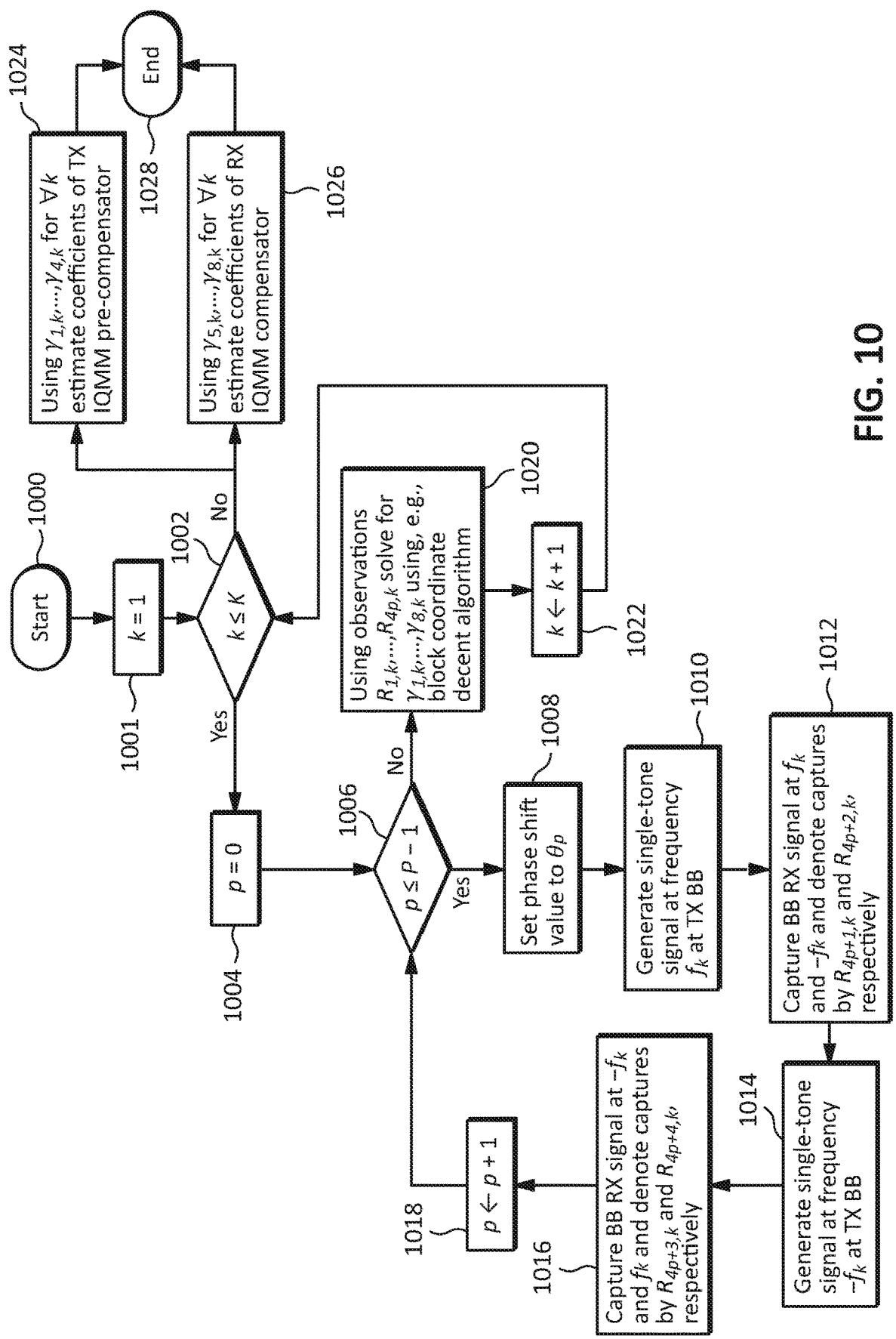
FIG. 10 illustrates an embodiment of method for joint TX and RX IQMM calibration according to this disclosure.

FIG. 10 illustrates an embodiment of method for joint TX and RX IQMM calibration according to this disclosure. The method illustrated in FIG. 10 may begin at operation 1000. At operation 1001, a counter k may be initialized to 1. At operation 1002, the method may check the value of the counter k. If k is less than or equal to the maximum value K, the method may proceed to operation 1004 where a counter p is initialized to zero. At operation 1006, the method may check the value of the counter p. If the counter p is less than or equal to the maximum value P−1, the method may proceed to operation 1008 where the phase shift value may be set to $\theta_p$.

At operation 1010, a single-tone pilot signal may be generated at frequency $f_k$ and applied at baseband to the TX path 400. At operation 1012, the received pilot signal may be captured at frequencies $f_k$ and $f_{-k}$ at baseband of the RX path 402 and denoted by $R_{4p+1,k}$ and $R_{4p+2,k}$, respectively. At operation 1014, a single-tone pilot signal may be generated at frequency $-f_k$ and applied at baseband to the TX path 400. At operation 1016 the received pilot signal may be captured at frequencies $-f_k$ and $f_k$ at baseband of the RX path 402 and denoted by $R_{4p+3,k}$ and $R_{4p+4,k}$, respectively.

At operation 1018, the counter p may be incremented, and the method may return to operation 1006 where the method may check the value of the counter p. If the counter p is greater than the maximum value P−1, the method may proceed to operation 1020 where the observations $R_{1,k}, \ldots, R_{4p,k}$ may be used to solve for $\gamma_{1,k}, \ldots \gamma_{8,k}$, for example, using a BCD algorithm.

At operation 1022, the method may increment the value of the counter k and return to operation 1002, where the method may check the value of the counter k. If k greater than the maximum value K, the method may proceed to operations 1024 and 1026. At operation 1024, using $\gamma_{1,k} \ldots \gamma_{4,k}$ for $\forall k$, the method may estimate coefficients for TX IQMM pre-compensator 418.

At operation 1026, using $\gamma_{5,k}, \ldots \gamma_{8,k}$ for $\forall k$, the method may estimate coefficients for RX IQMM compensator 444. The method may then terminate at operation 1028.

In some embodiments, P=3 phase shifters may be enough to obtain 12 independent observations as used in some of the examples herein. However, any number of phase shifts may be used to obtain and solve fewer or more equations. In some embodiments, $R_{1,k}, \ldots, R_{4p,k}$ may be obtained by capturing the time-domain signal at baseband (BB) of the RX path 402 and converting it to a frequency-domain signal, for example, using a Fast Fourier transform (FFT).

Alternative IQMM Parameter Estimations

In some alternative embodiments, the following parameters, which may depend on gain and filter mismatches, may be defined $$V_{TX}(f) \triangleq \frac{H_{1TX}(f)}{g_{TX} H_{2TX}(f)}, \qquad (24)$$

$$V_{RX}(f) \triangleq \frac{H_{1RX}(f)}{g_{RX} H_{2RX}(f)}.$$

TX IQMM parameters $\phi_{TX}$, $V_{TX}(f)$ and RX IQMM parameters $\phi_{RX}$, $V_{RX}(f)$ may be jointly estimated for a set of selected continuous-time frequencies $\pm f_1, \ldots, \pm f_K$ over the desired frequency band. These estimates may then be used to obtain coefficients for a one or more compensators and/or pre-compensator using, for example, one or more of the algorithms described below.

Simplified BCD Estimation (Second Algorithm)

In some embodiments, the following parameters may be defined $$z_{1,k} \triangleq A_{RX} A_{TX} G_{1RX}(f_k) G_{1TX}(f_k),$$

$$z_{2,k} \triangleq A_{RX} A_{TX}^* G_{1RX}(-f_k) G_{2TX}(-f_k),$$

$$z_{3,k} \triangleq A_{RX}^* A_{TX}^* G_{2RX}(-f_k) G_{1TX}^*(-f_k),$$

$$z_{4,k} \triangleq A_{RX} A_{TX}^* G_{1RX}(-f_k) G_{1TX}(-f_k),$$

$$z_{5,k} \triangleq A_{RX} A_{TX} G_{1RX}(f_k) G_{2TX}(f_k),$$

$$z_{6,k} \triangleq A_{RX}^* A_{TX}^* G_{2RX}(f_k) G_{1TX}^*(-f_k),$$

$$z_{7,k} \triangleq A_{RX}^* A_{TX} G_{2RX}(f_k) G_{2TX}^*(-f_k),$$

$$z_{8,k} \triangleq A_{RX}^* A_{TX}^* G_{2RX}(-f_k) G_{2TX}^*(f_k), \qquad (25)$$

which may used to reformulate equations (6) as follows:

$$R_{1,k} = A_{RX} A_{TX} G_{1RX}(f_k) G_{1TX}(f_k) + \qquad (26)$$
$$A_{RX}^* A_{TX} G_{2RX}(f_k) G_{2TX}^*(-f_k) = z_{1,k} + z_{7,k}$$

$$R_{2,k} = A_{RX} A_{TX}^* G_{1RX}(-f_k) G_{2TX}(-f_k) + A_{RX}^* A_{TX}^* G_{2RX}(-f_k) G_{1TX}^*(f_k) =$$
$$z_{2,k} + z_{3,k}$$

$$R_{3,k} = A_{RX} A_{TX}^* G_{1RX}(-f_k) G_{1TX}(-f_k) + A_{RX}^* A_{TX}^* G_{2RX}(-f_k) G_{2TX}^*(f_k) =$$
$$z_{4,k} + z_{8,k}$$

$$R_{4,k} = A_{RX} A_{TX} G_{1RX}(f_k) G_{2TX}(f_k) + A_{RX}^* A_{TX} G_{2RX}(f_k) G_{1TX}^*(-f_k) =$$
$$z_{5,k} + z_{6,k}$$

$$R_{5,k} = \beta_{1,k} A_{RX} A_{TX} G_{1RX}(f_k) G_{1TX}(f_k) +$$
$$\beta_{2,k}^* A_{RX}^* A_{TX} G_{2RX}(f_k) G_{2TX}^*(-f_k) = \beta_{1,k} z_{1,k} + \beta_{2,k}^* z_{7,k}$$

$$R_{6,k} = \beta_{2,k} A_{RX} A_{TX}^* G_{1RX}(-f_k) G_{2TX}(-f_k) +$$
$$\beta_{1,k}^* A_{RX}^* A_{TX}^* G_{2RX}(-f_k) G_{1TX}^*(f_k) = \beta_{2,k} z_{2,k} + \beta_{1,k}^* z_{3,k}$$

$$R_{7,k} = \beta_{2,k} A_{RX} A_{TX}^* G_{1RX}(-f_k) G_{1TX}(-f_k) \beta_{1,k}^* A_{RX}^*$$
$$A_{TX}^* G_{2RX}(-f_k) G_{2TX}^*(f_k) = \beta_{2,k} z_{4,k} + \beta_{1,k}^* z_{8,k}$$

$$R_{8,k} = \beta_{1,k} A_{RX} A_{TX} G_{1RX}(f_k) G_{2TX}(f_k) +$$
$$\beta_{2,k}^* A_{RX}^* A_{TX} G_{2RX}(f_k) G_{1TX}^*(-f_k) = \beta_{1,k} z_{5,k} + \beta_{2,k}^* z_{6,k}$$

$$R_{9,k} = \beta_{3,k} A_{RX} A_{TX} G_{1RX}(f_k) G_{1TX}(f_k) +$$
$$\beta_{2,k}^* A_{RX}^* A_{TX} G_{2RX}(f_k) G_{2TX}^*(-f_k) = \beta_{3,k} z_{1,k} + \beta_{4,k}^* z_{7,k}$$

$$R_{10,k} = \beta_{4,k} A_{RX} A_{TX}^* G_{1RX}(-f_k) G_{2TX}(-f_k) +$$
$$\beta_{3,k}^* A_{RX}^* A_{TX}^* G_{2RX}(-f_k) G_{1TX}^*(f_k) = \beta_{4,k} z_{2,k} + \beta_{3,k}^* z_{3,k}$$

$$R_{11,k} = \beta_{4,k} A_{RX} A_{TX}^* G_{1RX}(-f_k) G_{1TX}(-f_k) +$$
$$\beta_{3,k}^* A_{RX}^* A_{TX}^* G_{2RX}(-f_k) G_{2TX}^*(f_k) = \beta_{4,k} z_{4,k} + \beta_{3,k}^* z_{8,k}$$

$$R_{12,k} = \beta_{3,k} A_{RX} A_{TX} G_{1RX}(f_k) G_{2TX}(f_k) +$$
$$\beta_{4,k}^* A_{RX}^* A_{TX} G_{2RX}(f_k) G_{1TX}^*(-f_k) = \beta_{3,k} z_{5,k} + \beta_{4,k}^* z_{6,k}$$

The Equations (26) may provide 12 complex equations $R_{1,k}, \ldots, R_{12,k}$ with 12 complex unknowns $Z_{1,k}, \ldots, z_{8,k}$, $\beta_{1,k}, \ldots, \beta_{4,k}$. The problem of solving the equations may then be formulated as follows:

$$x^{opt} \underset{x \in \mathbb{C}^{12}}{\mathrm{argmin}} \|f(x)\|^2, \qquad (27)$$

$$f(x) = \begin{bmatrix} z_{1,k} + z_{7,k} - R_{1,k} \\ z_{2,k} + z_{3,k} - R_{2,k} \\ z_{4,k} + z_{8,k} - R_{3,k} \\ z_{5,k} + z_{6,k} - R_{4,k} \\ \beta_{1,k}z_{1,k} + \beta_{2,k}^*z_{7,k} - R_{5,k} \\ \beta_{2,k}z_{2,k} + \beta_{1,k}^*z_{3,k} - R_{6,k} \\ \beta_{2,k}z_{4,k} + \beta_{1,k}^*z_{8,k} - R_{7,k} \\ \beta_{1,k}z_{5,k} + \beta_{2,k}^*z_{6,k} - R_{8,k} \\ \beta_{3,k}z_{1,k} + \beta_{4,k}^*z_{7,k} - R_{9,k} \\ \beta_{4,k}z_{2,k} + \beta_{3,k}^*z_{3,k} - R_{10,k} \\ \beta_{4,k}z_{4,k} + \beta_{3,k}^*z_{8,k} - R_{11,k} \\ \beta_{3,k}z_{5,k} + \beta_{4,k}^*z_{6,k} - R_{12,k} \end{bmatrix},$$

where the vector of unknowns may be given by $$x = [z_{1,k}, \ldots, z_{8,k}, \beta_{1,k}, \ldots, \beta_{4,k}]^T. \quad (28)$$

In some embodiments, all 12 equations in Equations (26) may be time-aligned for correct estimation of IQMM parameters. A problem represented by Equations (27) may be solved, for example, using a BCD algorithm which may minimize the cost function $\|f(x)\|^2$ iteratively along a coordinate block while the other coordinates remain fixed. In some embodiments using this method, descent in the cost function may be ensured at every iteration.

In the BCD algorithm, the unknown variables may be divided into the following two blocks $$x = [z_{1,k} \ldots z_{8,k}]^T,$$

$$x_2 = [\beta_{1,k}, \beta_{2,k}, \beta_{3,k}, \beta_{4,k}]^T. \quad (29)$$

Each iteration of the BCD solver may include two steps (i=1,2). At the ith step of the ($\ell$+1)th iteration, $\|f(x_1^{(\ell+1)}, \ldots, x_{i-1}^{(\ell+1)}, x_i, x_{i+1}^{(\ell)}, \ldots, x_2^{(\ell)})\|^2$ may be minimized with respect to $x_i$. With the specific choice of coordinate blocks in Equations (29), the cost function at the ith step may become a least-squares problem in terms of $x_i$, which may be readily solved.

The following parameters may be defined $$A_1^{(\ell)} = \begin{bmatrix} 1 & 1 \\ \beta_{1,k}^{(\ell)} & \beta_{2,k}^{(\ell)*} \\ \beta_{3,k}^{(\ell)} & \beta_{4,k}^{(\ell)*} \end{bmatrix}, \quad (30)$$

$$A_2^{(\ell)} = \begin{bmatrix} 1 & 1 \\ \beta_{2,k}^{(\ell)} & \beta_{1,k}^{(\ell)*} \\ \beta_{4,k}^{(\ell)} & \beta_{3,k}^{(\ell)*} \end{bmatrix},$$

$$B^{(\ell)} = \begin{bmatrix} z_{1,k}^{(\ell+1)} & jz_{1,k}^{(\ell+1)} & z_{7,k}^{(\ell+1)} & -jz_{7,k}^{(\ell+1)} \\ z_{3,k}^{(\ell+1)} & -jz_{3,k}^{(\ell+1)} & z_{2,k}^{(\ell+1)} & jz_{2,k}^{(\ell+1)} \\ z_{8,k}^{(\ell+1)} & -jz_{8,k}^{(\ell+1)} & z_{4,k}^{(\ell+1)} & jz_{4,k}^{(\ell+1)} \\ z_{5,k}^{(\ell+1)} & jz_{5,k}^{(\ell+1)} & z_{6,k}^{(\ell+1)} & -jz_{6,k}^{(\ell+1)} \end{bmatrix}$$

$$R_{A_1} = [R_{1,k}, R_{5,k}, R_{9,k}]^T,$$

$$R_{A_2} = [R_{2,k}, R_{6,k}, R_{10,k}]^T,$$

$$R_{A_3} = [R_{3,k}, R_{7,k}, R_{11,k}]^T,$$

$$R_{A_4} = [R_{4,k}, R_{8,k}, R_{12,k}]^T,$$

$$R_{B_1} = [R_{5,k}, R_{6,k}, R_{7,k}, R_{8,k}]^T,$$

$$R_{B_2} = [R_{9,k}, R_{10,k}, R_{11,k}, R_{12,k}]^T.$$

These parameters may then be used for a BCD solver procedure as summarized in Table 2.

TABLE 2

3.     Choose initial guess $x_{(0)} \in \mathbb{C}^{12}$

4.     For $\ell = 0$ to $iter_{max} - 1$ reapeat, a. Obtain $z_{1,k}^{(\ell+1)}, \ldots, z_{8,k}^{(\ell+1)}$ as follows $$\begin{bmatrix} z_{1,k}^{(\ell+1)} \\ z_{7,k}^{(\ell+1)} \end{bmatrix} = pinv(A_1^{(\ell)})R_{A_1}, \quad \begin{bmatrix} z_{2,k}^{(\ell+1)} \\ z_{3,k}^{(\ell+1)} \end{bmatrix} = pinv(A_2^{(\ell)})R_{A_2}$$

$$\begin{bmatrix} z_{4,k}^{(\ell+1)} \\ z_{8,k}^{(\ell+1)} \end{bmatrix} = pinv(A_2^{(\ell)})R_{A_3}, \quad \begin{bmatrix} z_{5,k}^{(\ell+1)} \\ z_{6,k}^{(\ell+1)} \end{bmatrix} = pinv(A_1^{(\ell)})R_{A_4}$$

b. Obtain $\beta_{1,k}^{(\ell+1)}, \ldots, \beta_{4,k}^{(\ell+1)}$ as follows $$\beta_{1,k}^{(\ell+1)} = [1, 1j, 0, 0] \times (pinv(B^{(\ell)})R_{B_1}),$$

$$\beta_{2,k}^{(\ell+1)} = [0, 0, 1, 1j] \times (pinv(B^{(\ell)})R_{B_1}),$$

$$\beta_{3,k}^{(\ell+1)} = [1, 1j, 0, 0] \times (pinv(B^{(\ell)})R_{B_2}),$$

$$\beta_{4,k}^{(\ell+1)} = [0, 0, 1, 1j] \times (pinv(B^{(\ell)})R_{B_2})$$

In some embodiments, and depending on the implementation details, the method described above with respect to Equations (25) through (30) and Table 2 may provide a relatively simple solution and/or may involve lower computational complexity compared to the first algorithm.

In some embodiments, to speed up the convergence of the BCD solver in Table 2, the final solution $x^{(iter_{max})}$ of a frequency tone may be used as an initial point of the next adjacent tone ($x^{(0)}$) since the IQMM parameters of adjacent tones (if the tones are relatively close to each other in frequency) may be similar.

After sweeping frequency for k=1, ..., K and obtaining estimates of $z_{1,k}, \ldots, z_{8,k}$, estimates for $\phi_{TX/RX}$ and $V_{TX/RX}(f)$ may be obtained as $$\hat{\phi}_{TX} = \frac{1}{2K}\sum_{k=1}^{K} \text{angle}\left(\frac{T_{TX}^*(-f_k)}{T_{TX}(f_k)}\right), \quad (31)$$

$$\hat{\phi}_{RX} = \frac{1}{2K}\sum_{k=1}^{K} \text{angle}\left(\frac{T_{RX}(f_k)}{T_{RX}^*(-f_k)}\right),$$

$$\hat{V}_{TX}(f) = T_{TX}(f)e^{+j\hat{\phi}_{TX}},$$

$$f = \pm f_1, \ldots, \pm f_K,$$

$$\hat{V}_{RX}(f) = T_{RX}(f)e^{-j\hat{\phi}_{RX}},$$

$$f = \pm f_1, \ldots, \pm f_K,$$

-continued where $T_{TZ}(f_k) = \dfrac{z_{1,k} + z_{5,k}}{z_{1,k} - z_{5,k}}$, (32)

$T_{TX}(-f_k) = \dfrac{z_{4,k} + z_{2,k}}{z_{4,k} - z_{2,k}}$, $k = 1, \ldots K$, $T_{RX}(f_k) = \dfrac{z_{1,k} + z_{3,k}^*}{z_{1,k} - z_{3,k}^*}$, $T_{RX}(-f_k) = \dfrac{z_{4,k} + z_{6,k}^*}{z_{4,k} - z_{6,k}^*}$, $k = 1, \ldots K$.

Estimation With Reduced Equation Set (Third Algorithm)

In some embodiments, one or more image of image signals maybe ignored, which my be equivalent to assuming that $G_{2RX}(f)G_{2TX}(f)=0$ for every f. Thus, the last four equations in Equations (6) may be omitted, and only the first eight equations used.

A single tone pilot signal at frequency $f_k$ may be used to obtain the observed outputs at the principal and mirror frequencies ($f_k$ and $-f_k$) which may be denoted by $R_{1,k}$ and $R_{2,k}$, respectively. Since the number of unknowns is larger than the number of equations, another single-tone pilot signal may be sent at frequency $-f_k$, for which observations at the principal and mirror frequencies ($-f_k$ and $f_k$) may be denoted by $R_{3,k}$ and $R_{4,k}$, respectively. Next, single-tone pilot signals at frequencies $f_k$ and $-f_k$ may be sent separately and another phase shift value $\theta_1$ applied to obtain four additional observations $R_{5,k}, \ldots, R_{8,k}$. Based on the assumption that $G_{2RX}(\pm f)G_{2TX}(\pm f)=0$, the following equations may be obtained $R_{1,k} = A_{RX}A_{TX}G_{1RX}(f_k)G_{1TX}(f_k) = z_{1,k}$ (33)

$R_{2,k} = A_{RX}A_{TX}^*G_{1RX}(-f_k)G_{2TX}(-f_k) +$
$\qquad A_{RX}^*A_{TX}^*G_{2RX}(-f_k)G_{1TX}^*(f_k) = z_{2,k} + z_{3,k}$ $R_{3,k} = A_{RX}A_{TX}^*G_{1RX}(-f_k)G_{1TX}(-f_k) = z_{4,k}$ $R_{4,k} = A_{RX}A_{TX}G_{1RX}(f_k)G_{2TX}(f_k) +$
$\qquad A_{RX}^*A_{TX}^*G_{2RX}(f_k)G_{1TX}^*(-f_k) = z_{5,k} + z_{6,k}$ $R_{5,k} = \beta_{1,k}A_{RX}A_{TX}G_{1RX}(f_k)G_{1TX}(f_k) = \beta_{1,k}z_{1,k}$ $R_{6,k} = \beta_{2,k}A_{RX}A_{TX}^*G_{1RX}(-f_k)G_{2TX}(-f_k) +$
$\qquad \beta_{1,k}^*A_{RX}^*A_{TX}^*G_{2TX}(-f_k)G_{1TX}^*(f_k) = \beta_{2,k}z_{2,k} + \beta_{1,k}^*z_{3,k}$ $R_{7,k} = \beta_{2,k}A_{RX}A_{TX}^*G_{1RX}(-f_k)G_{1TX}(-f_k) = \beta_{2,k}z_{4,k}$ $R_{8,k} = \beta_{1,k}A_{RX}A_{TX}G_{1RX}(f_k)G_{2TX}(f_k) +$
$\qquad \beta_{2,k}^*A_{RX}^*A_{TX}^*G_{2RX}(f_k)G_{1TX}^*(-f_k) = \beta_{1,k}z_{5,k} + \beta_{2,k}^*z_{6,k}$ where $\beta_{1,k}$ and $\beta_{2,k}$ may represent the gain and phase changes that may be caused by using the phase shifter with different phase values and may not be the same for positive and negative baseband frequencies as the response of phase shifter might not be symmetric around the center frequency. With Equations (33), there may be 8 equations with 8 unknowns $z_{1,k}, \ldots, z_{6,k}, \beta_{1,k}, \beta_{2,k}$ which may be solved as follows $\beta_{1,k} = \dfrac{R_{5,k}}{R_{1,k}}$, (34)

$\beta_{2,k} = \dfrac{R_{7,k}}{R_{3,k}}$, $z_{1,k} = R_{1,k}$, $\begin{bmatrix} z_{2,k} \\ z_{3,k} \end{bmatrix} = \begin{bmatrix} 1 & 1 \\ \beta_{2,k} & \beta_{1,k}^* \end{bmatrix}^{-1} \begin{bmatrix} R_{2,k} \\ R_{6,k} \end{bmatrix}$, $z_{4,k} = R_{3,k}$, $\begin{bmatrix} z_{5,k} \\ z_{6,k} \end{bmatrix} = \begin{bmatrix} 1 & 1 \\ \beta_{1,k} & \beta_{2,k}^* \end{bmatrix}^{-1} \begin{bmatrix} R_{4,k} \\ R_{8,k} \end{bmatrix}$.

After sweeping the frequencies for $k=1, \ldots, K$ and obtaining estimates of $z_{1,k}, \ldots, z_{6,k}$, $\phi_{TX/RX}$ and $V_{TX/RX}(f)$ may be estimated as follows $\hat{\phi}_{TX} = \dfrac{1}{2K}\sum_{k=1}^{K} \text{angle}\left(\dfrac{T_{TX}^*(-f_k)}{T_{TX}(f_k)}\right)$, (35)

$\hat{\phi}_{RX} = \dfrac{1}{2K}\sum_{k=1}^{K} \text{angle}\left(\dfrac{T_{RX}(f_k)}{T_{TX}^*(-f_k)}\right)$, $\hat{V}_{TX}(f) = T_{TX}(f)e^{+j\hat{\phi}_{TX}}$, $f = \pm f_1, \ldots, \pm f_K$, $\hat{V}_{RX}(f) = T_{RX}(f)e^{+j\hat{\phi}_{RX}}$, $f = \pm f_1, \ldots, \pm f_K$, where $T_{TX}(f_k) = \dfrac{z_{1,k} + z_{5,k}}{z_{1,k} - z_{5,k}}$, (36)

$T_{TX}(-f_k) = \dfrac{z_{4,k} + z_{2,k}}{z_{4,k} - z_{2,k}}$, $k = 1, \ldots K$, $T_{RX}(f_k) = \dfrac{z_{1,k} + z_{3,k}^*}{z_{1,k} - z_{3,k}^*}$, $T_{RX}(-f_k) = \dfrac{z_{4,k} + z_{6,k}^*}{z_{4,k} - z_{6,k}^*}$, $k = 1, \ldots K$.

Initial Estimate for BCD Algorithm

In some embodiments, a result obtained using one algorithm may be used as an initial estimate for another algorithm. For example, as described below, estimates obtained by ignoring one or more image of image signals using the third algorithm may be used as initial estimates for a BCD algorithm using the second algorithm.

Specifically, assuming the image of image signal is zero, the first 8 equations of Equations (26) may provide equations for use with Equations (33). The parameters $z_{1,k}, \ldots, z_{6,k}, \beta_{1,k}, \beta_{2,k}$ may be estimated using Equations (34). Then using the last four equations in Equations (26), the parameters $z_{7,k}, z_{8,k}, \beta_{3,k}, \beta_{4,k}$ may be estimated to be used as the initial point $x^{(0)}$ in the BCD solver in the second algorithm. A procedure for obtaining $x^{(0)}$ for frequency $f_k$ is summarized in Table 3.

TABLE 3

1. Perform measurements and obtain $R_{1,k}, \ldots, R_{12,k}$
2. Solve for $z_{1,k}^{(0)}, \ldots, z_{4,k}^{(0)}, \beta_{1,k}^{(0)}, \beta_{2,k}^{(0)}$ as TABLE 3-continued $$\beta_{1,k}^{(0)} = \frac{R_{5,k}}{R_{1,k}}, B_{2,k}^{(0)} = \frac{R_{7,k}}{R_{3,k}},$$

$$z_{1,k}^{(0)} = R_{1,k}, \begin{bmatrix} z_{2,k}^{(0)} \\ z_{3,k}^{(0)} \end{bmatrix} = \begin{bmatrix} 1 & 1 \\ \beta_{2,k}^{(0)} & \beta_{1,k}^{(0)*} \end{bmatrix}^{-1} \begin{bmatrix} R_{2,k} \\ R_{6,k} \end{bmatrix},$$

$$z_{4,k}^{(0)} = R_{3,k}, \begin{bmatrix} z_{5,k}^{(0)} \\ z_{6,k}^{(0)} \end{bmatrix} = \begin{bmatrix} 1 & 1 \\ \beta_{1,k}^{(0)} & \beta_{2,k}^{(0)*} \end{bmatrix}^{-1} \begin{bmatrix} R_{4,k} \\ R_{8,k} \end{bmatrix}$$

3. Solve for $z_{7,k}^{(0)}$, $z_{8,k}^{(0)}$, $\beta_{3,k}^{(0)}$, $\beta_{4,k}^{(0)}$ as
$\beta_3^{(0)} \times [1, 1j, 0, 0] \times c$, $\beta_4^{(0)} \times [0, 0, 1, 1j] \times c$, $$z_{7,k}^{(0)} = \frac{R_{9,k} - \beta_{3,k}^{(0)} z_{1,k}^{(0)}}{\beta_{4,k}^{(0)*}}, \quad z_{8,k}^{(0)} = \frac{R_{11,k} - \beta_{4,k}^{(0)} z_{4,k}^{(0)}}{\beta_{3,k}^{(0)*}},$$

where $$c = \begin{bmatrix} \text{Re}\{z_{3,k}^{(0)}\} & \text{Im}\{z_{3,k}^{(0)}\} & \text{Re}\{z_{2,k}^{(0)}\} & -\text{Im}\{z_{2,k}^{(0)}\} \\ \text{Im}\{z_{3,k}^{(0)}\} & -\text{Re}\{z_{3,k}^{(0)}\} & \text{Im}\{z_{2,k}^{(0)}\} & \text{Re}\{z_{2,k}^{(0)}\} \\ \text{Re}\{z_{5,k}^{(0)}\} & -\text{Im}\{z_{5,k}^{(0)}\} & \text{Re}\{z_{6,k}^{(0)}\} & \text{Im}\{z_{6,k}^{(0)}\} \\ \text{Im}\{z_{5,k}^{(0)}\} & \text{Re}\{z_{5,k}^{(0)}\} & \text{Im}\{z_{6,k}^{(0)}\} & -\text{Re}\{z_{6,k}^{(0)}\} \end{bmatrix}^{-1} \begin{bmatrix} \text{Re}\{R_{10,k}\} \\ \text{Im}\{R_{10,k}\} \\ \text{Re}\{R_{12,k}\} \\ \text{Im}\{R_{12,k}\} \end{bmatrix}$$

4. The initial guess is equal to $x^{(0)} = [z_{1,k}^{(0)}, \ldots z_{8,k}^{(0)}, \beta_{1,k}^{(0)}, \ldots \beta_{4,k}^{(0)}]^T$ In some embodiments, and depending on the implementation details, using an initial estimate obtained through the method of Table 3 as an initial estimate for a BCD solver in Table 2 may increase the speed of convergence and/or reduce the total number of required iterations.

TX Pre-Compensation

After obtaining estimates of $\phi_{TX/RX}$ and $V_{TX/RX}(f)$ for $f=\pm f_1, \ldots, \pm f_K$, for example, as described above using the second and third algorithms, these parameters may be used to compensate for FD-IQMM in the TX path.

An examples of pre-compensator for which coefficients may be estimated according to this disclosure include the one illustrated in FIG. 6.

Some pre-compensator coefficients that may partially or fully remove TX FD-IQMM for the pre-compensator shown in FIG. 6 may be given by $$W_{TX}^{opt}(f) = \frac{1 - V_{TX}(f)e^{-j\phi_{TX}}}{1 + V_{TX}(f)e^{-j\phi_{TX}}} e^{-j2\pi fT_D}, \quad (37)$$

where $W_{TX}(f)$ may denote the frequency response of filter $w_{TX}[n]$. In some embodiments, and depending on the implementation details, this expression may provide optimal values for the coefficients.

After obtaining estimates of $\phi_{TX}$ and $V_{TX}(f)$ for $f=\pm f_1, \ldots, \pm f_K$, by any calibration algorithm, they may be used to obtain coefficients for the compensator illustrated in FIG. 6 (for a given $T_D$) at the selected frequencies using an LS approach as described above in Equations (18) and (19) to obtain an FIR approximation of the optimal filter $W_{TX}^{opt}(f)$. In some embodiments, other pre-compensator structures may be used, and the calibration algorithm may be applied to other IQ mismatch pre-compensation structures as well.

Furthermore, techniques other than LS may be used to obtain filter coefficients for the pre-compensation structures.

RX Compensation

In some embodiments, after obtaining estimates of $\phi_{RX}$ and $V_{RX}(f)$ for $f=\pm f_1, \ldots, \pm f_K$, these estimates may be used to compensate FD-IQMM in the RX path. Some examples of compensators for which coefficients may be estimated using estimates of $\phi_{RX}$ and $V_{RX}(f)$ according to this disclosure include those illustrated in FIGS. 7, 8, and 9. Alternatively, estimates of $\phi_{RX}$ and $V_{RX}(f)$ for $f=\pm f_1, \ldots, \pm f_K$ may be used to compensate IQMM in the frequency-domain rather than the time-domain, for example, for compensation of IQMM in OFDM systems.

In some embodiments, compensator coefficients that may partially or fully remove RX FD-IQMM for the compensators shown in FIGS. 7 and 8 may be given by $$W_{1,RX}^{opt}(f) = -\left(\frac{V_{RX}(f) - e^{j\phi_{RX}}}{V_{RX}(f)Pe^{j\phi_{RX}}}\right)e^{-j2\pi fT_D}, \quad (38)$$

$$W_{2,RX}^{opt}(f) = \left(-1 + \frac{e^{j\phi_{RX}}}{V_{RX}(f)}\right)e^{-j2\pi fT_D},$$

where $W_{1,RX}(f)$ and $W_{2,RX}(f)$ may denote the frequency responses of filters $w_{1,RX}[n]$ and $W_{2,RX}[n]$, respectively. Compensator coefficients that partially or fully remove RX FD-IQMM for the RVC shown in FIG. 9 may be given by $$\alpha_{RX}^{opt} = \tan\phi_{RX}, \quad (39)$$

$$D_{RX}^{opt}(f) = \frac{V_{RX}(f)}{\cos\phi_{RX}} e^{-j2\pi fT_D},$$

where $D_{RX}(f)$ may denote the frequency response of filter $d_{RX}[n]$. In some embodiments, and depending on the implementation details, these expressions may provide optimal values for the coefficients.

Thus, after obtaining estimates of $\phi_{RX}$ and $V_{RX}(\pm f_k)$ for $k=1, \ldots, K$. Equations (38) and (39) may be used to obtain coefficients for the compensators illustrated in FIGS. 7, 8, and 9 (for a given $T_D$) at the selected frequencies using an LS approach as described above in Equations (18) and (19) to obtain an FIR approximation of the optimal filters $W_{1,RX}^{opt}(f)$, $W_{2,RX}^{opt}(f)$, or $D_{RX}^{opt}(f)$. In some embodiments, other approaches may be used to find coefficients for filters $w_{1,RX}[n]$, $w_{2,RX}[n]$, $d_{RX}[n]$, and factor $\alpha$.

Figure 11:
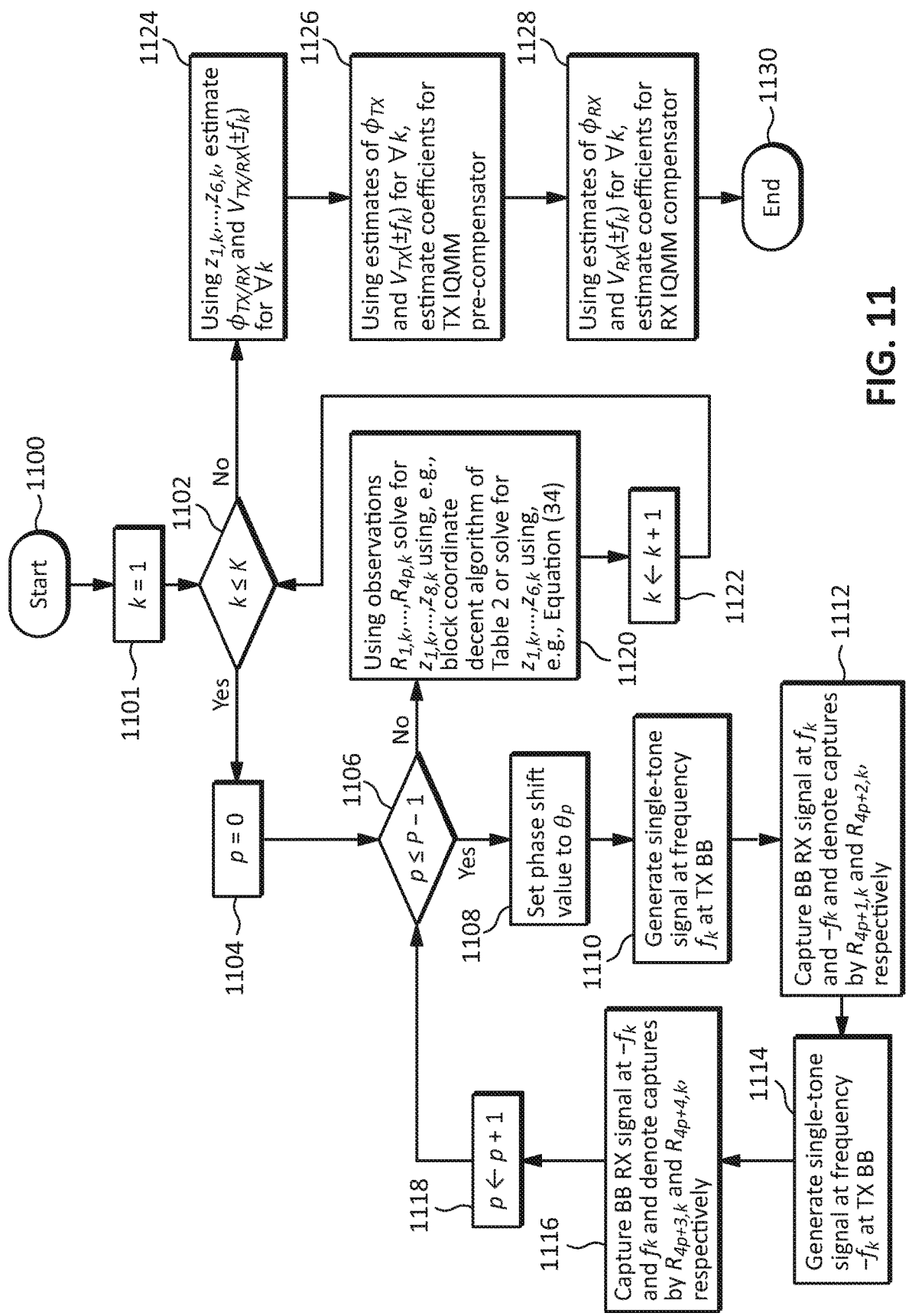
FIG. 11 illustrates an alternative embodiment of method for joint TX and RX IQMM calibration according to this disclosure.

FIG. 11 illustrates an alternative embodiment of method for joint TX and RX IQMM calibration according to this disclosure. The method illustrated in FIG. 11 may begin at operation 1100. At operation 1101, a counter k may be initialized to 1. At operation 1102, the method may check the value of the counter k. If k is less than or equal to the maximum value K, the method may proceed to operation 1104 where a counter p is initialized to zero. At operation 1106, the method may check the value of the counter p. If the counter p is less than or equal to the maximum value P−1, the method may proceed to operation 1108 where the phase shift value may be set to $\theta_p$.

At operation 1110, a single-tone pilot signal may be generated at frequency $f_k$ and applied at baseband to the TX path 400. At operation 1112, the received pilot signal may be captured at frequencies $f_k$ and $-f_k$ at baseband of the RX path 402 and denoted by $R_{4p+1,k}$ and $R_{4p+2,k}$, respectively. At operation 1114, a single-tone pilot signal may be generated at frequency $-f_k$ and applied at baseband to the TX path 400. At operation 1116 the received pilot signal may be captured at frequencies $-f_k$ and $f_k$ at baseband of the RX path 402 and denoted by $R_{4p+3,k}$ and $R_{4p+4,k}$, respectively.

At operation 1118, the counter p may be incremented, and the method may return to operation 1106 where the method may check the value of the counter p. If the counter p is greater than the maximum value P−1, the method may proceed to operation 1120 where the observations $R_{1,k}$, ..., $R_{4p,k}$ may be used to solve for $z_{1,k}$, ..., $z_{8,k}$ using, for example, the BCD algorithm of Table 2, or to solve for $z_{1,k}$, ..., $z_{6,k}$ using, for example, Equations (34). At operation 1122, the method may increment the value of the counter k and return to operation 1102, where the method may check the value of the counter k. If k greater than the maximum value K, the method may proceed to operation 1124 where, using $z_{1,k}$, ..., $z_{6,k}$, the method may estimate $\phi_{TX/RX}$ and $V_{TX/RX}(\pm f_k)$ for $\forall k$. At operation 1126, using the estimates of $\phi_{TX}$ and $V_{TX}(\pm f_k)$ for $\forall k$, the method may estimate coefficients for TX IQMM pre-compensator 418. At operation 1128, using the estimates of $\phi_{RX}$ and $V_{RX}(\pm f_k)$ for $\forall k$, the method may estimate coefficients for RX IQMM compensator 444. The method may then terminate at operation 1130.

In some embodiments. P=3 phase shifters may be sufficient for the second algorithm, and P=2 may be sufficient for the third algorithm. In some embodiments. $R_{1,k}$, ..., $R_{4p,k}$ may be obtained by capturing the baseband time-domain signal at the RX path and converting it to a frequency-domain signal using, for example, a Fast Fourier transform (FFT).

The operations and/or components described with respect to the embodiments illustrated in FIGS. 10 and 11, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Enhanced Estimation of RX Cross Multiplication Factor

In some embodiments, the accuracy of a cross multiplication factor $\alpha_{RX}$ for an RX RVC may depend largely or only on the accuracy of an RX phase mismatch $\phi_{RX}$. This may be apparent, for example, with reference to Equation (21). Thus, any inaccuracy in the initial or estimated value of $\phi_{RX}$ may cause a corresponding inaccuracy in the estimation of $\alpha_{RX}$.

A method for re-estimating a cross multiplication factor according to this disclosure may involve adjusting an initial estimate of a cross multiplication factor by correcting for inaccuracies caused by one or more residual RX phase mismatches. Some embodiments may be described in the context of systems and/or methods that may estimate IQMM parameters using techniques described in this disclosure. However, the principles relating to re-estimating a cross multiplication factor according to this disclosure have independent utility and may be used with any other systems and/or methods for estimating IQMM parameters.

In some embodiments, a re-estimating technique for a cross multiplication factor according to this disclosure may begin, for example, using a pilot-based calibration method as described above to obtain RVC coefficients for a compensator in the RX path. The RVC coefficients may be used to compensate one or more pilot (e.g., single-tone) signals, which may have been measured already, sent from the TX path through the loopback path. The RX phase mismatch $\phi_{RX}$ may then be re-estimated using the IQ compensated single-tone signals and the estimated TX phase mismatch. Some embodiments may be implemented as follows.

The received BB time-domain signal at RX for single-tone signals sent at frequencies $f_k$ and $-f_k$ with phase shift value $\theta_p$ may be denoted by $r_p^{(k)}[n]$ and $r_p^{(-k)}[n]$ respectively. The obtained RVC coefficients $\hat{\alpha}_{RX}^{opt}$ and $\hat{d}_{RX}^{opt}$ may be applied to the RX signals $r_p^{(k)}[n]$ and $r_p^{(-k)}[n]$ for p=0 only. The I and Q components of the compensated signal may be denoted by $y_I^{(k)}[n]$, $y_Q^{(k)}[n]$ and $y_I^{(-k)}[n]$, $y_Q^{(-k)}[n]$ respectively. If an estimation of $\alpha_{RX}$, i.e., $\hat{\alpha}_{RX}^{opt}$, is not accurate, and the RX frequency-dependent and gain mismatches have been removed, then samples $y^{(k)}=y_I^{(k)}+jy_Q^{(k)}$ and $y^{(-k)}=y_I^{(-k)}+jy_Q^{(-k)}$ may still contain FI-IQMM due to the RX phase mismatch. Thus, the relationship between samples of $y^{(k)}$ and signal $z_{RX}^{(k)}[n]=z_{RX,I}^{(k)}[n]+jz_{RX,Q}^{(k)}[n]$, which may denote the baseband signal without RX IQMM, may be written as $$y_I^{(k)}[n]=z_{RX,I}^{(k)}[n],$$

$$y_Q^{(k)}[n]=\cos \phi_{RX,k}^r z_{RX,Q}^{(k)}[n]-\sin \phi_{RX,k}^r z_{RX,I}^{(k)}[n], \quad (40)$$

where $\phi_{RX,k}^r$ may denote the residual phase mismatch due to incorrect estimation of $\alpha_{RX}$. Equation (40) may be re-arranged to establish that $$\frac{\mathbb{E}(z_{RX,I}^{(k)} z_{RX,Q}^{(k)})}{\mathbb{E}((z_{RX,Q}^{(k)})^2)} = \frac{\cos\phi_{RX,k}^r \mathbb{E}(y_I^{(k)} y_Q^{(k)}) + \cos\phi_{RX,k}^r \sin\phi_{RX,k}^r ((y_I^{(k)})^2)}{\mathbb{E}((y_Q^{(k)})^2) + \sin^2\phi_{RX,k}^r \mathbb{E}((y_I^{(k)})^2) + 2\sin\phi_{RX,k}^r \mathbb{E}(y_I^{(k)} y_Q^{(k)})}, \quad (41)$$

where the expectation $\mathbb{E}(\cdot)$ may be taken over time n. Assuming TX IQMM is frequency independent (FI), the relation between clean baseband I/Q samples $u_I^{(k)}/u_Q^{(k)}$ and the baseband equivalent impaired samples $z_{TX,I}^{(k)}/z_{TX,Q}^{(k)}$ after mixers in TX path may be given by $$z_{TX,I}^{(k)}[n]=u_I^{(k)}[n]-g_{TX} \sin \phi_{TX} u_Q^{(k)}[n],$$

$$z_{TX,Q}^{(k)}[n]=g_{TX} \cos \phi_{TX} u_Q^{(k)}[n]. \quad (42)$$

Assuming $\mathbb{E}(u_I u_Q)=0$ and $\mathbb{E}(u_I^2)=\mathbb{E}(u_Q^2)$ may provide $$\frac{\mathbb{E}(z_{TX,I}^{(k)} z_{TX,Q}^{(k)})}{\mathbb{E}((z_{TX,Q}^{(k)})^2)} = -\tan\phi_{TX}. \quad (43)$$

Combining equations (41) and (43) and assuming that $z_{RX}^{(k)}[n]=z_{TX}^{(k)}[n]$, which may be the case for p=0 (no phase shift), may provide $$\frac{\cos\phi_{RX,k}^r \mathbb{E}(y_I^{(k)} y_Q^{(k)}) + \cos\phi_{RX}^r \sin\phi_{RX,k}^r \mathbb{E}(y_I^{(k)})^2)}{\mathbb{E}((y_Q^{(k)})^2) + \sin^2\phi_{RX,k}^r \mathbb{E}((y_I^{(k)})^2) + 2\sin\phi_{RX,k}^r \mathbb{E}(y_I^{(k)} y_Q^{(k)})} = -\tan\hat{\phi}_{TX}, \quad (44)$$

which may be solved to obtain $\phi_{RX,k}^r$ and update the RX cross multiplication factor as $$\alpha_{RX}^{re-estimate} = \tan\left(\operatorname{atan}\hat{\alpha}_{RX}^{opt} + \frac{1}{2K}\sum_{\substack{k=-K \\ k \neq 0}}^{K} \hat{\phi}_{RX,k}^{r}\right). \quad (45)$$

In some implementations, there may be no phase ambiguity due to the a tan operator in Equation (45) because a tan $\alpha_{RX}^{opt}$ may be an estimate of the phase mismatch $\phi_{RX}$ and hence may have a small value. In some embodiments, the nonlinear Equation (44) be solved using different methods such as Newton's method and/or the like, and $\mathbb{E}(\cdot)$ may be computed by averaging over time.

In some embodiments, and depending on the implementation details, a method as described, which may be characterized as a pilot-based calibration method to re-estimate $\alpha_{RX}$ more accurately, may only involve offline processing of measurements that may have already been obtained and, thus, may have the advantage of not involving additional measurements.

In some embodiments, an accurate estimation of the cross multiplication factor $\alpha_{RX}$ for RVC may be beneficial, for example, for obtaining a symmetric image rejection ratio (IRR) across frequency in RX, where IRR may be defined as the ratio of power of the primary signal to the power of the image signal.

Figure 12:
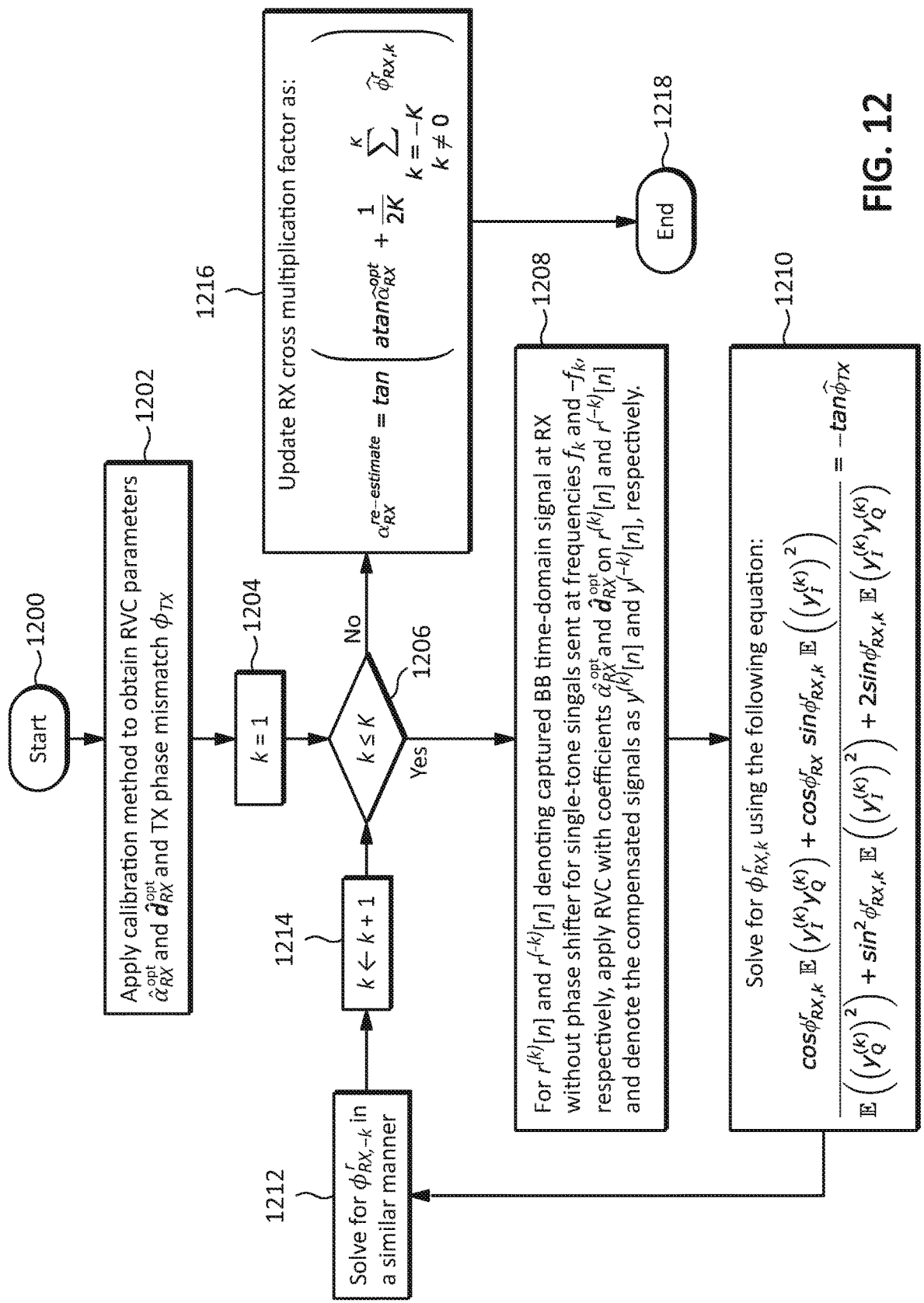
FIG. 12 illustrates an embodiment of method for enhanced estimation of an RX cross multiplication factor in an RVC according to this disclosure.

FIG. 12 illustrates an embodiment of method for enhanced estimation of an RX cross multiplication factor according to this disclosure. The method illustrated in FIG. 12 may begin at operation 1200. At operation 1202, the method may use any calibration method as described above to obtain RVC parameters $\hat{\alpha}_{RX}^{opt}$ and $\hat{d}_{RX}^{opt}$ and TX phase mismatch $\phi_{TX}$. At operation 1204, the method may set counter k=1. At operation 1206, the method may check if the value of k is less than or equal to the maximum value K, the method may proceed to operation 1208 where, for $r^{(k)}[n]$ and $r^{(-k)}[n]$ denoting a captured baseband time-domain signal at RX without using a phase shifter for single-tone signals sent at frequencies $f_k$ and $-f_k$, respectively, it may apply RVC with coefficients $\hat{\alpha}_{RX}^{opt}$ and $\hat{d}_{RX}^{opt}$ on $r^{(k)}[n]$ and $r^{(-k)}[n]$ and denote the compensated signals as $y^{(k)}[n]$ and $y^{(-k)}[n]$, respectively. K may be any integer greater than zero. In some embodiments, using a larger number of frequency tones (i.e., a larger value of K), may enable cross multiplication factor $\alpha_{RX}$ to be re-estimated more accurately.

At operation 1210, the method may solve for $\phi_{RX,k}^{r}$ using Equation (44). At operation 1212, the method may solve for $\phi_{RX,-k}^{r}$ in a similar manner using Equation (44). At operation 1214, the counter k may be incremented, and method may return to operation 1206 where the value of the counter k may be checked. If k is greater than the maximum value K, the method may proceed to operation 1216 where the RX cross multiplication factor may be updated using Equation (45). The method may then end at operation 1218.

This disclosure encompasses numerous inventive principles. These principles may have independent utility and may be embodied individually, and not every embodiment may utilize every principle. Moreover, the principles may also be embodied in various combinations, some of which may amplify the benefits of the individual principles in a synergistic manner.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of compensating for in-phase (I) and quadrature (Q) mismatch (IQMM) in a transceiver, the method comprising:
    sending first and second signals from a transmit path through a loopback path, using a phase shifter to introduce a phase shift in at least one of the first and second signals, to obtain first and second signals received by a receive path;
    using the first and second signals received by the receive path to obtain joint estimates of transmit and receive IQMM, at least in part, by estimating the phase shift, wherein using the first and second signals received by the receive path to obtain joint estimates of the transmit and receive IQMM comprises processing the first and second signals received by the receive path as a function of one or more frequency-dependent IQMM parameters; and
    compensating for IQMM using the joint estimates of the transmit and receive IQMM.

2. The method of claim 1, further comprising:
    sending a third signal from the transmit path through the loopback path, using the phase shifter to introduce a phase shift in at least two of the first, second, and third signals, to obtain a third signal received by the receive path; and
    using the first, second, and third signals received by the receive path to obtain the joint estimates of the transmit and receive IQMM, at least in part, by estimating the phase shift.

3. The method of claim 1, wherein using the first and second signals received by the receive path to obtain the joint estimates of the transmit and receive IQMM is performed using a system of nonlinear equations.

4. The method of claim 1, wherein compensating for IQMM using the joint estimates of the transmit and receive IQMM comprises estimating coefficients of an IQMM pre-compensator at the transmit path.

5. The method of claim 1, wherein compensating for IQMM using the joint estimates of the transmit and receive IQMM comprises estimating coefficients of an IQMM compensator at the receive path.

6. The method of claim 1, wherein the first signal received by the receive path comprises a component at a principle frequency of the first signal and a component at a mirror frequency of the first signal.

7. The method of claim 1, wherein the joint estimates of the transmit and receive IQMM are obtained by solving a system of equations, and one or more of the equations comprises:
at least one of the first or second signals received by the receive path;
a first parameter representing, at least in part, the phase shift;
a second parameter representing, at least in part, a desired frequency response of the transmit path;
a third parameter representing, at least in part, a frequency response of the transmit path due to transmit IQMM;
a fourth parameter representing, at least in part, a desired frequency response of the receive path; and
a fifth parameter representing, at least in part, a frequency response of the receive path due to receive IQMM.

8. The method of claim 7, wherein the one or more of the equations further comprises:
a sixth parameter representing, at least in part, a gain and delay for the transmit path; and
a seventh parameter representing, at least in part, a gain and delay for the receive path.

9. The method of claim 8, wherein:
the desired frequency response of the transmit path depends, at least in part, on a frequency response of an in-phase filter in the transmit path, a frequency response of a quadrature filter in the transmit path, a phase mismatch between an in-phase mixer and a quadrature mixer in the transmit path, and a gain mismatch between the in-phase mixer and the quadrature mixer in the transmit path; and
the frequency response of the transmit path due to transmit IQMM depends, at least in part, on the frequency response of the in-phase filter in the transmit path, the frequency response of the quadrature filter in the transmit path, the phase mismatch between the in-phase mixer and the quadrature mixer in the transmit path, and the gain mismatch between the in-phase mixer and the quadrature mixer in the transmit path.

10. The method of claim 8, wherein:
the desired frequency response of the receive path depends, at least in part, on a frequency response of an in-phase filter in the receive path, a frequency response of a quadrature filter in the receive path, a phase mismatch between an in-phase mixer and a quadrature mixer in the receive path, and a gain mismatch between the in-phase mixer and the quadrature mixer in the receive path; and
the frequency response of the receive path due to receive IQMM depends, at least in part, on the frequency response of the in-phase filter in the receive path, the frequency response of the quadrature filter in the receive path, the phase mismatch between the in-phase mixer and the quadrature mixer in the receive path, and the gain mismatch between the in-phase mixer and the quadrature mixer in the receive path.

11. The method of claim 1, wherein:
the joint estimates of the transmit and receive IQMM are obtained using a first iterative algorithm based on an initial estimate; and
the initial estimate is obtained using a second algorithm.

12. The method of claim 11, wherein the first iterative algorithm comprises a block coordinate descent, and the second algorithm comprises a matrix inversion.

13. A system comprising:
a quadrature transceiver having a transmit path with a quadrature up-converter, a receive path with a quadrature down-converter, and a loopback path coupled between the up-converter and the down-converter;
a signal generator arranged to apply first and second pilot signals to the transmit path;
a signal observer arranged to capture the first and second pilot signals received from the receive path;
a phase shifter arranged to apply a phase shift to at least one of the first and second pilot signals between the up-converter and the down-converter; and
a processor configured to:
obtain estimated in-phase (I) and quadrature (Q) mismatch (IQMM) parameters for the transmit path and the receive path by estimating the phase shift; and
estimate one or more compensation coefficients for the quadrature transceiver based on the estimated IQMM parameters.

14. The system of claim 13 further comprising an IQMM pre-compensator arranged to compensate an IQMM of the transmit path based on one or more of the compensation coefficients.

15. The system of claim 13 further comprising an IQMM compensator arranged to compensate an IQMM of the receive path based on one or more of the compensation coefficients.

16. A method comprising:
estimating an initial value of a phase mismatch for a receive (RX) path of a quadrature transceiver;
estimating an initial value of a cross multiplication factor for a real-value compensator (RVC) for the RX path based on the initial value of the RX phase mismatch;
obtaining a re-estimate of the RX phase mismatch; and
correcting the initial value of the cross multiplication factor based on the re-estimate of the RX phase mismatch.

17. The method of claim 16 wherein, obtaining the re-estimate of the RX phase mismatch comprises:
obtaining one or more RVC parameters for the RVC;
obtaining an estimated transmit (TX) phase mismatch for a TX path of the quadrature transceiver;
applying the RVC with the one or more RVC parameters to a time-domain signal received without phase shift at baseband of the RX path, thereby generating a compensated time-domain signal; and
re-estimating a residual RX phase mismatch based on the compensated time-domain signal and the estimated TX phase mismatch.

18. The method of claim 17, wherein, the re-estimate of the RX phase mismatch is a first re-estimate for a first pilot signal at a first frequency, and the method further comprises:
obtaining a second re-estimate of the RX phase mismatch for a second pilot signal at a second frequency; and
correcting the initial value of the cross multiplication factor based on the first and second re-estimate of the RX phase mismatch.

19. The method of claim 18, further comprising:
obtaining a third re-estimate of the RX phase mismatch for a third pilot signal at a third frequency; and
correcting the initial value of the cross multiplication factor based on the first, second, and third re-estimate of the RX phase mismatch.

* * * * *